(12) United States Patent
Shibuya et al.

(10) Patent No.: US 9,573,617 B2
(45) Date of Patent: Feb. 21, 2017

(54) STEERING CONTROL DEVICE AND STEERING CONTROL METHOD

(71) Applicant: NISSAN MOTOR CO., LTD., Yokohama-shi, Kanagawa (JP)

(72) Inventors: Masaki Shibuya, Atsugi (JP); Shogo Miyasaka, Zama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/759,379

(22) PCT Filed: Dec. 19, 2013

(86) PCT No.: PCT/JP2013/007490
§ 371 (c)(1),
(2) Date: Jul. 6, 2015

(87) PCT Pub. No.: WO2014/108967
PCT Pub. Date: Jul. 17, 2014

(65) Prior Publication Data
US 2015/0336606 A1    Nov. 26, 2015

(30) Foreign Application Priority Data

Jan. 11, 2013   (JP) ................................. 2013-003880
Jan. 11, 2013   (JP) ................................. 2013-003881

(51) Int. Cl.
*B62D 5/04*       (2006.01)
*B60W 10/02*      (2006.01)
(Continued)

(52) U.S. Cl.
CPC ............ *B62D 5/0433* (2013.01); *B60W 10/02* (2013.01); *B60W 10/04* (2013.01); *B60W 10/20* (2013.01);
(Continued)

(58) Field of Classification Search
CPC ....... B62D 5/0433; B62D 5/001; B62D 5/003; B60W 10/20; B60W 10/04; B60W 10/02
See application file for complete search history.

(56) References Cited

U.S. PATENT DOCUMENTS 5,228,757 A * 7/1993 Ito ........................ B60T 8/1755
                                                303/146
6,155,655 A * 12/2000 Matsuno ............... B60T 8/1755
                                                303/140
(Continued)

FOREIGN PATENT DOCUMENTS

JP    2001173476 A    6/2001
JP    2003254113 A    9/2003
(Continued)

*Primary Examiner* — Kevin Hurley
*Assistant Examiner* — Gabriela C Craciun
(74) *Attorney, Agent, or Firm* — Young Basile Hanlon & MacFarlane, P.C.

(57) ABSTRACT

To suppress a voltage drop of a battery in an idle reduction state, a vehicle includes an idle reduction function of stopping the idling of the engine and restarting the engine when the vehicle starts moving. Then, a steering-by-wire control processing is performed to disengage a clutch and to control driving of turning motors. When the idling of the engine is stopped by the idle reduction function, a disengaged state of the clutch is maintained and the driving of the turning motors is restricted.

13 Claims, 10 Drawing Sheets

(51) Int. Cl.
*B60W 10/04* (2006.01)
*B60W 10/20* (2006.01)
*F02D 29/02* (2006.01)
*B62D 5/00* (2006.01)
*F02N 11/08* (2006.01)
*F02D 41/02* (2006.01)

(52) U.S. Cl.
CPC .............. *B62D 5/001* (2013.01); *B62D 5/003* (2013.01); *F02D 29/02* (2013.01); *F02N 11/0814* (2013.01); *F02D 41/022* (2013.01); *F02N 11/084* (2013.01); *Y02T 10/48* (2013.01)

(56) References Cited

U.S. PATENT DOCUMENTS

| | | | | |
|---|---|---|---|---|
| 7,497,285 | B1* | 3/2009 | Radev | B60K 6/26 |
| | | | | 180/65.225 |
| 9,002,560 | B2* | 4/2015 | Hasegawa | B60K 6/445 |
| | | | | 701/22 |
| 9,376,107 | B2* | 6/2016 | Suzuki | B60W 30/02 |
| 2003/0078712 | A1* | 4/2003 | Shimakage | B62D 1/286 |
| | | | | 701/41 |
| 2006/0009325 | A1* | 1/2006 | Ohtake | B60W 30/18018 |
| | | | | 477/98 |
| 2006/0113129 | A1* | 6/2006 | Tabata | B60K 6/365 |
| | | | | 180/65.25 |
| 2008/0021612 | A1 | 1/2008 | Sakuma | |
| 2011/0136620 | A1* | 6/2011 | Gibson | B60W 10/02 |
| | | | | 477/64 |
| 2012/0290179 | A1* | 11/2012 | Oishi | B60T 7/042 |
| | | | | 701/54 |
| 2013/0218389 | A1* | 8/2013 | Tanishima | B60K 6/48 |
| | | | | 701/22 |
| 2015/0159613 | A1* | 6/2015 | Jensen | B60W 10/02 |
| | | | | 701/68 |
| 2015/0203152 | A1* | 7/2015 | Katayama | B62D 6/002 |
| | | | | 701/41 |
| 2015/0307102 | A1* | 10/2015 | Mitsuyasu | B60W 30/18172 |
| | | | | 701/48 |
| 2015/0336606 | A1* | 11/2015 | Shibuya | B60W 10/02 |
| | | | | 180/444 |
| 2015/0353128 | A1* | 12/2015 | Shibuya | B60W 10/02 |
| | | | | 701/41 |

FOREIGN PATENT DOCUMENTS

| | | |
|---|---|---|
| JP | 2004231085 A | 8/2004 |
| JP | 2006182055 A | 7/2006 |
| JP | 2008024166 A | 2/2008 |
| JP | 2010188930 A | 9/2010 |
| JP | 2010248964 A | 11/2010 |

* cited by examiner

STEERING CONTROL DEVICE AND STEERING CONTROL METHOD

CROSS REFERENCE TO RELATED APPLICATIONS

Priority is claimed to Japanese Patent Application No. 2013-003880 (filed on Jan. 11, 2013) and Japanese Patent Application No. 2013-003881 (filed on Jan. 11, 2013), the entire contents of which are incorporated herein by reference.

TECHNICAL FIELD

This disclosure relates to a steering control device and a steering control method.

BACKGROUND

JP 2001-173476 A describes an idle reduction technology as a countermeasure against exhaust emissions or for improvement of fuel efficiency, which stops an engine automatically when a vehicle stops and the engine is an idling state, and restarts the engine when the vehicle starts moving.

A steering-by-wire system consumes electric power in turning wheels with a turning motor and in generating a steering reaction force with a reaction force motor. However, an alternator is stopped in an idle reduction state such as the above-mentioned prior art, and thus available electric power for an ordinary engine vehicle other than a hybrid vehicle is limited. Therefore, when the steering-by-wire is performed ordinarily in the idle reduction state, the voltage of the battery may drop, and the other electric system may be affected.

SUMMARY

One object of an embodiment of the present invention is to suppress the voltage drop of the battery in the idle reduction state.

According to an aspect of the present disclosure, there is provided a steering control device used in a vehicle, the vehicle stopping an engine when a predetermined condition is satisfied and restarting the engine when the vehicle starts moving. Then, a clutch is provided between a steering mechanism which is operated by the driver to steer and a turning mechanism configured to turn a wheel, the clutch being capable of coupling and decoupling the steering mechanism and the turning mechanism. Then, there is provided a turning actuator capable of providing a turning torque to the turning mechanism depending on an amount of steering by the driver. The clutch is disengaged and control of driving the turning actuator is performed. When the engine is stopped, the disengaged state of the clutch is maintained and a drive torque of the turning actuator is restricted.

DETAILED DESCRIPTION OF THE EMBODIMENTS

Figure 1:
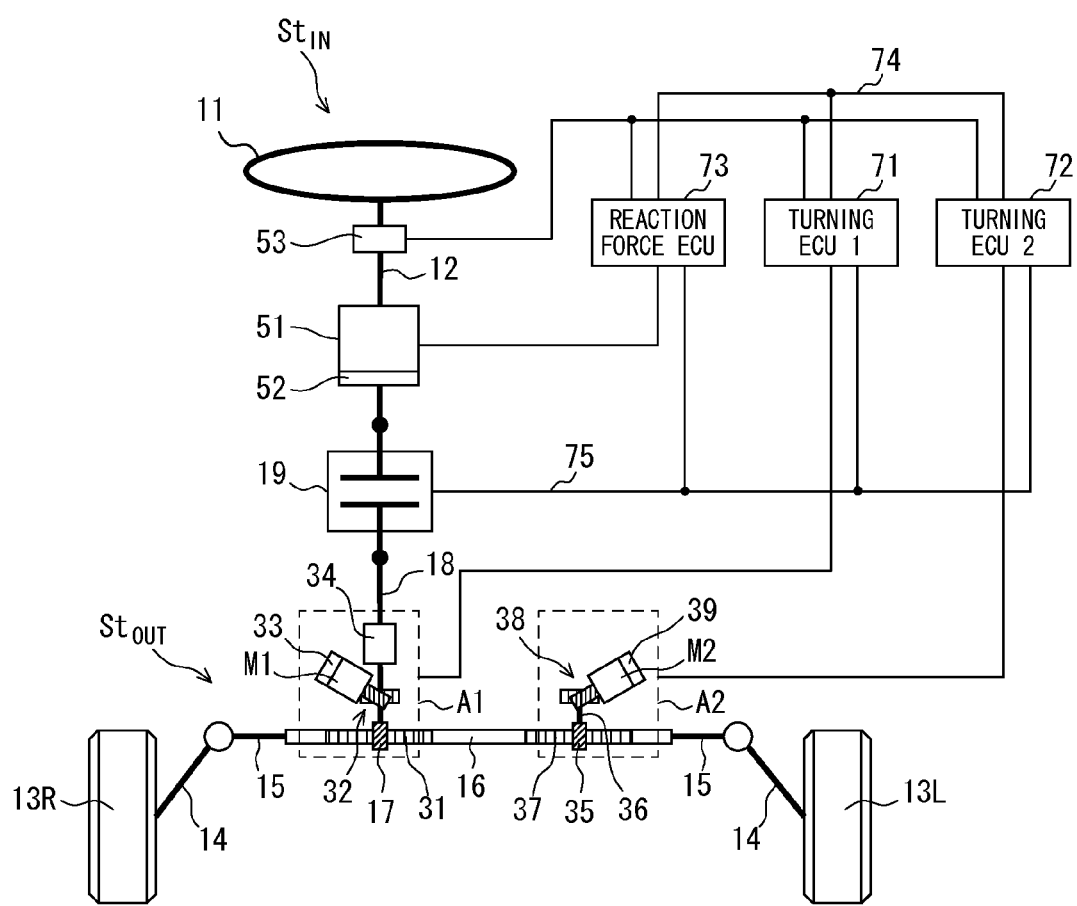
FIG. 1 is a schematic configuration diagram of a steering apparatus.

Hereinafter, embodiments of the present disclosure will now be described with reference to the drawings.
(First Embodiment)
(Configuration)
First, the configuration of a steering-by-wire will be described. FIG. 1 is a schematic configuration diagram of a steering apparatus.

A steering wheel 11 is coupled to a steering shaft 12. Wheels (turning wheels) 13L and 13R are coupled to a first pinion shaft 18 via a knuckle arms 14, tie rods 15, a rack shaft 16, and a pinion gear 17, in this order. The steering shaft 12 and the first pinion shaft 18 are coupled to each other via a clutch 19 in a switchable manner such that they can be coupled with or decoupled from each other.

In this configuration, the steering wheel 11 and the steering shaft 12 which are located on the input side of the clutch 19 are a steering input mechanism $St_{IN}$ in which the steering shaft 12 is rotated by a steering operation by a driver. Furthermore, the knuckle arms 14, the tie rods 15, the rack shaft 16, the pinion gear 17, and the first pinion shaft 18 exist on the output side of the clutch 19 are a turning output mechanism $St_{OUT}$ configured to turn the wheels 13L and 13R by the rotation of the first pinion shaft 18.

Therefore, in a state in which the clutch 19 is connected (engaged), when rotating the steering wheel 11, the steering shaft 12, the clutch 19, and the first pinion shaft 18 rotate. A rotational movement of the first pinion shaft 18 is converted into a back-and-forth movement of the tie rods 15 by the rack shaft 16 and the pinion gear 17, the back-and-forth movement turns the wheels 13L and 13R via the knuckle arms 14.

The clutch 19 includes an electromagnetic clutch of non-excitation-engaging type. That is, when an electromagnetic coil is not excited, a roller meshes between a cam surface of the input shaft and an outer ring of the output shaft by, for example, a cam roller mechanism, to engage the input shaft to the output shaft. On the other hand, when the electromagnetic coil is excited, the meshing of the roller between the cam surface of the input shaft and the outer ring of the output shaft is released by attraction of the armature. The input shaft and the output shaft are disconnected.

The rack shaft 16 extends in a vehicle body transverse direction (vehicle width direction), and a rack gear (teeth) 31 is formed on one side of the rack shaft (in this example, a right side of the vehicle body). A pinion gear 17 meshes the rack gear 31. The state of meshing of the rack gear 31 and the pinion gear 17 is adjusted by a retainer mechanism.

The first pinion shaft 18 includes the input shaft on the clutch side and the output shaft on the pinion gear side. The output shaft is coupled to the first turning motor M1 via, for example, a worm gear 32. A resolver 33 detecting a motor rotation angle is provided on the first turning motor M1.

The worm gear 32 includes a worm wheel coupled to the first pinion shaft 18 and a worm coupled to the first turning motor M1. A worm shaft obliquely crosses a worm wheel shaft. This is for downsizing a module in a perpendicular direction to the first pinion shaft 18.

In the worm gear 32, a twist angle of the worm is set to be larger than a repose angle (friction angle) such that the worm wheel can be rotated by the rotation of the worm and the worm can be rotated by the rotation of the worm wheel, that is, can be reversely driven.

A torque sensor 34 is provided between the input shaft and the output shaft of the first pinion shaft 18. The pinion gear 17, the output shaft of the first pinion shaft 18, the worm gear 32, the first turning motor M1, the resolver 34, and the torque sensor 34 are configured as an integrated composite component (assembly). This is referred to as the first actuator A1. The first actuator A1 is used in common as components of an electric power steering apparatus.

According to the first actuator A1, when the first turning motor M1 is driven in a state in which the clutch 19 is disengaged, the first pinion shaft 18 is rotated via the worm gear 32. Therefore, the turning angle of the wheels 13L and 13R changes depending on the rotation angle of the first turning motor M1. Therefore, by controlling the driving of the first turning motor M1 depending on the steering operation by the driver when the clutch 19 is disengaged, intended steering control characteristics as the steering-by-wire function are achieved.

Furthermore, when the first turning motor M1 is driven in a state in which the clutch 19 is engaged, a motor torque is transmitted to the first pinion shaft 18 via the worm gear 32. Therefore, by controlling the driving of the first turning motor M1 depending on the steering operation by the driver when the clutch 19 is engaged, intended assist characteristics reducing the operation burden of the driver are achieved.

A second pinion shaft 36 is coupled to the other side of the rack shaft 16 (in this example, a left side of the vehicle body) via a pinion gear 35. That is, a rack gear (teeth) 37 is formed on the other side of the rack shaft 16 (in this example, the left side of the vehicle body). The pinion gear 35 meshes the rack gear 37. The state of meshing of the rack gear 37 and the pinion gear 35 is adjusted by a retainer mechanism.

The second turning motor M2 is coupled to the second pinion shaft 36 via, for example, a worm gear 38. The second turning motor M2 is the same type of the motor as the first turning motor M1. A resolver 39 detecting a motor rotation angle is provided on the second turning motor M2.

The worm gear 38 includes a worm wheel coupled to the second pinion shaft 36 and a worm coupled to the second turning motor M2. A worm shaft obliquely crosses a worm wheel shaft. This is for downsizing a module in a perpendicular direction to the second pinion shaft 36.

In the worm gear 38, a twist angle of the worm is set to be larger than a repose angle (friction angle) such that the worm wheel can be rotated by the rotation of the worm and the worm can be rotated by the rotation of the worm wheel, that is, can be reversely driven. The pinion gear 35, the output shaft of the second pinion shaft 36, the worm gear 38, the second turning motor M2, and the resolver 39 are configured as an integrated composite component (assembly). This is referred to as the second actuator A2.

According to the second actuator A2, when the second turning motor M2 is driven in the state in which the clutch 19 is disengaged, the second pinion shaft 36 is rotated via the worm gear 32. Therefore, the turning angle of the wheels 13L and 13R changes depending on the rotation angle of the second turning motor M2. Therefore, by controlling the driving of the second turning motor M2 depending on the steering operation by the driver when the clutch 19 is disengaged, the intended steering control characteristics as the steering-by-wire function are achieved.

A reaction force motor 51 is coupled to the steering shaft 12. The reaction force motor 51 includes a rotor rotating with the steering shaft 12, and a stator which faces the rotor and is fixed to a housing. The rotor is formed by arranging magnets with equal intervals in a circumferential direction and by fixing them to a rotor core by, for example, insert molding. The stator is formed by arranging iron cores on which coils are wound with equal intervals in a circumferential direction and by fixing them to the housing by, for example, shrink fitting. A resolver 52 detecting the motor rotation angle is provided on the reaction force motor 51.

A steering angle sensor 53 is provided on the steering shaft 12. According to the reaction force motor 51, when the reaction force motor 51 is driven in the state in which the clutch 19 is disengaged, a motor torque is transmitted to the steering shaft 12. Therefore, by controlling the driving of the reaction force motor 51 depending on the reaction force received from the road surface while the clutch 19 is disengaged to perform the steering-by-wire, intended reaction force characteristics providing operation reaction force against the steering operation by the driver are achieved. What is described above is the configuration of the steering apparatus.

Next, the configuration of the control system will be described. The present embodiment includes the first turning controller (turning ECU 1) 71, the second turning controller (turning ECU 2) 72, and a reaction force controller (reaction force ECU) 73. The respective controllers include microcomputers, for example.

The first turning controller 71 is configured to receive signals from the resolver 33, the torque sensor 34, and the steering angle sensor 53, and to control the driving of the first turning motor M1 via a driver circuit. The second turning controller 72 is configured to receive signals from the resolver 39 and the steering angle sensor 53, and to control the driving of the second turning motor M2 via a driver circuit. The reaction force controller 73 is configured to receive signals from the resolver 52 and the steering angle sensor 53, and to control the driving of the reaction force motor 51 via a driver circuit.

The resolver 33 configured to detect the motor rotation angle $\theta m1$ of the first turning motor M1. The resolver 33 configured to output a detection signal depending on the rotation angle of the rotor from the rotor coil when the excitation signal is input to the stator coil. The first turning controller 71 is configured to output the excitation signal to the stator coil and to determine the motor rotation angle $\theta m1$ of the first turning motor M1 on the basis of amplitude modulation of the detection signal received from the rotor coil, by a signal processing circuit. It is to be noted that the first turning controller 71 is configured to treat right turning as a positive value and treats left turning as a negative value.

Similarly, the motor rotation angle $\theta m2$ of the second turning motor M2 is detected by the second turning controller 72 via the resolver 39, and the rotation angle $\theta r$ of the reaction force motor 51 is detected by the reaction force controller 73 via the resolver 52.

The torque sensor 34 is configured to detect the torque Ts input to the first pinion shaft 18. The torque sensor 34 is configured to detect a twist angle of a torsion bar interposed between the input side and the output side of the first pinion shaft 18 with, for example, a Hall device, and to output to the first turning controller 71 an electrical signal obtained by converting a change in magnetic flux density produced due to a relative angular displacement between a multi-pole magnet and a yoke. The first turning controller 71 is configured to determine a torque Ts on the basis of the input electrical signal. It is to be noted that the first turning controller 71 is configured to treat right steering by the driver as a positive value and treats left steering as a negative value.

The steering angle sensor 53 includes a rotary encoder, for example, and is configured to detect a steering angle θs of the steering shaft 12. The steering angle sensor 53 is configured to detect, while a disc-shaped scale rotates with the steering shaft 12, a light passing through a slit of the scale with two phototransistors, and to output to the respective controllers a pulse signal in association with the rotation of the steering shaft 12. The respective controllers are configured to determine the steering angle θs of the steering shaft 12 on the basis of the input pulse signal. It is to be noted that the respective controllers are configured to treat the right steering as a positive value and treats the left steering as a negative value.

It is to be noted that the controllers are connected to one another via a communication line 74 to be capable of communicating with one another. That is, a communication path adopting an on-vehicle communication network (on-vehicle LAN) standard, such as a CSMA/CA type multiplex communication (CAN: Controller Area Network), Flex Ray, or the like, is constructed.

The respective controllers are connected to the clutch 19 via a communication line 75. The communication line 75 is a communication path for outputting a clutch control signal capable of switching the clutch 19 such that the clutch is engaged or disengaged. The clutch control signal is a signal for disengaging the clutch 19. When the respective controllers output the clutch control signal, the clutch 19 is disengaged. When any one of the controllers stops outputting the clutch control signal, the clutch 19 is engaged. What is described above is the configuration of the control system.

Next, control modes will be described. There are a two-motor SBW mode (2M-SBW), a two-motor EPS mode (2M-EPS), a one-motor SBW mode (1M-SBW), a one-motor EPS mode (1M-EPS) and a manual steering mode (MS) in one embodiment of the present disclosure.

In the two-motor SBW mode, the steering-by-wire control is performed by two motors. In the two-motor EPS mode, the electric power steering control is performed by two motors. Furthermore, in the one-motor SBW mode, the steering-by-wire control is performed only by one motor. In the one-motor EPS mode, the electric power steering control is performed only by one motor. Then, in the manual steering mode, all of the steering control stops.

(Two-Motor SBW Mode)

In the two-motor SBW mode, in a state in which the clutch control signal is output to disengage the clutch 19, the first turning controller 71 controls the driving of the first turning motor M1 and the second turning controller 72 controls the driving of the second turning motor M2, thereby the turning angle control is performed. That is, the first turning motor M1 and the second turning motor M2 cooperate so as to share and output a demanded turning force. On the other hand, the reaction force controller 73 controls the driving of the reaction force motor 51, and thereby performs the reaction force control. Thus, the intended steering characteristics as the steering-by-wire function are achieved and a good operation feeling is achieved.

The first turning controller 71 and the second turning controller 72 set a target turning angle θw* corresponding to the steering angle θs and estimate an actual turning angle θw. Then, the first turning controller 71 and the second turning controller 72 receives the motor rotation angles θm1 and θm2 and control the driving of the first turning motor M1 and the second turning motor M2 such that the actual turning angle θw matches the target turning angle θw* by using, for example, a robust model matching method.

The target turning angle θw* is set depending on, for example, a vehicle speed V. That is, in stationary steering or low-speed traveling, the target turning angle θw* is set so as to obtain a large turning angle θw with a small steering angle θs in order to reduce the operation burden of the driver. Furthermore, in high-speed traveling, the target turning angle θw* is set so as to suppress the change in the turning angle θw corresponding to the change in the steering angle θs in order to suppress an excessively sensitive vehicle behavior to ensure traveling stability. The actual turning angle θw is estimated on the basis of the steering angle θs, the motor rotation angle θm1, the motor rotation angle θm2, and the like.

The reaction force controller 73 sets the target reaction force torque Tr* corresponding to the reaction force received from the road surface in the steering operation and controls the driving of the reaction force motor 51 such that the torque of the reaction force motor 51 matches the target reaction force torque Tr*.

The target reaction force torque Tr* is set on the basis of, for example, the steering angle θs, a current Im1 flowing through the first turning motor M1, a current Im2 flowing through the second turning motor M2, and the like.

(Two-Motor EPS Mode)

In the two-motor EPS mode, in a state in which the output of the clutch control signal is stopped, and thus the clutch 19 is engaged, the first turning controller 71 controls the driving of the first turning motor M1 and the second turning controller 72 controls the driving of the second turning motor M2, thereby the assist control is performed. Thus, the steering system is connected mechanically to ensure a direct steering operability, and further, the operation burden of the driver is reduced by the electric power steering function.

The first turning controller 71 and the second turning controller 72 set a target assist torque Ta* and control the driving of the first turning motor M1 and the second turning motor M2 such that the torque of the first turning motor M1 matches the target assist torque Ta*.

The target assist torque Ta* is set depending on, for example, the vehicle speed V. That is, in stationary steering or low-speed traveling, the target assist torque Ta* is set to be larger in order to reduce the operation burden of the driver. Furthermore, in high-speed traveling, the target assist torque Ta* is set to be smaller in order to suppress the excessively sensitive vehicle behavior to ensure traveling stability.

On the other hand, in the two-motor EPS mode, the relay circuit of the reaction force motor 51 is disconnected. This is to prevent the reaction force motor 51 itself from being driven as a load by the rotation of the steering shaft 12, when the driver performs the steering operation and when the first turning controller 71 controls the driving of the first turning motor M1 and the second turning controller 72 controls the driving of the second turning motor M2.

(One-Motor SBW Mode)

In one-motor SBW mode, in a state in which the clutch control signal is output to disengage the clutch 19 and the first turning controller 71 does not control the driving of the first turning motor M1 (non-driving), the second turning controller 72 controls the driving of the second turning motor M2 to perform the turning angle control. That is, the second turning motor M2 outputs the needed turning force alone. On the other hand, the reaction force controller 73 controls the driving of the reaction force motor 51 to perform the reaction force control. Thus, the intended steering characteristics as the steering-by-wire function are achieved and the good operation feeling is achieved.

The setting of the target turning angle θw*, the control method of the second turning motor M2, the setting of the target reaction torque Tr*, and the control method of the reaction force motor 51 are the same as those in the two-motor SBW mode.

On the other hand, in the one-motor SBW mode, the relay circuit of the first turning motor M1 is disconnected, thereby the first turning motor M1 is disconnected from the electrical circuit. This is to prevent the first turning motor M1 itself from being driven as a load by the back-and-forth movement of the rack shaft 16, when the second turning controller 72 controls the driving of the second turning motor M2.

(One-Motor EPS Mode)

In one-motor EPS mode, in a state in which the output of the clutch control signal is stopped, and thus the clutch 19 is engaged, and the second turning controller 72 does not control the driving of the second turning motor M2 (non-driving), the first turning controller 71 controls the driving of the first turning motor M1, thereby the assist control is performed. Thus, the steering system is connected mechanically to ensure the direct steering operability, and further, the operation burden of the driver is reduced by the electric power steering function.

The setting of the target assist torque Ta*, and the control method of the first turning motor M1 are the same as those in the two-motor EPS mode.

On the other hand, in one-motor EPS mode, the relay circuit of the second turning motor M2 is disconnected, thereby the second turning motor M2 is disconnected from the electrical circuit. This is to prevent the second turning motor M2 itself from being driven as a load by the back-and-forth movement of the rack shaft 16, when the driver performs the steering operation and when the first turning controller 71 controls the driving of the first turning motor M1. For the similar reason, the relay circuit of the reaction force motor 51 is disconnected, thereby the reaction force motor 51 is disconnected from the electrical circuit. This is to prevent the reaction force motor 51 itself from being driven as a load by the rotation of the steering shaft 12, when the driver performs the steering operation and when the first turning controller 71 controls the driving of the first turning motor M1.

(Manual Steering Mode)

In the manual steering mode, in a state in which the output of the clutch control signal is stopped, and thus the clutch 19 is engaged, the first turning controller 71 does not control the driving of the first turning motor M1 (non-driving) and the second turning controller 72 does not control the driving of the second turning motor M2 (non-driving). That is, all of the steering control by the respective controllers is stopped. Thus, the steering system is connected mechanically to ensure the direct steering operability.

In the manual steering mode, the relay circuits of the first turning motor M1 and the second turning motor M2 are disconnected, thereby the first turning motor M1 and the second turning motor M2 are disconnected from the electrical circuit. This is to prevent the first turning motor M1 and the second turning motor M2 themselves from being driven as loads by the back-and-forth movement of the rack shaft 16, when the driver performs the steering operation. For the similar reason, the relay circuit of the reaction force motor 51 is disconnected, thereby the reaction force motor 51 is disconnected from the electrical circuit. This is to prevent the reaction force motor 51 itself from being driven as a load by the rotation of the steering shaft 12, when the driver performs the steering operation. What is described above is an overview of the control modes.

Next, the fail-safe will be described. The respective controllers are configured to perform self-diagnoses as to whether or not their control systems malfunction, and to switch the control mode depending on the diagnoses result. That is, the first turning controller 71 is configured to diagnose whether or not the first turning controller 71 itself, the first actuator A1 including the torque sensor 34, or the wiring system malfunctions. Furthermore, the second turning controller 72 is configured to diagnose whether or not the second turning controller 72 itself, the second actuator A2 without a torque sensor, or the wiring system malfunctions. Furthermore, the reaction force controller 73 is configured to diagnose whether or not the reaction force controller 73 itself, the reaction force motor 51, or the wiring system malfunctions.

Firstly, when all of the control system of the first turning controller 71, the control system of the second turning controller 72, and the control system of the reaction force controller 73 are normal, the two-motor SBW mode is set. However, when a low voltage is applied to the first turning motor M1 and the second turning motor M2, when the first turning motor M1 and the second turning motor M2 are overheated, when an ignition switch is turned on at starting (until the clutch 19 is disengaged), when the turning angle θw reaches a maximum turning angle at end-abutting, or the like, the two-motor EPS mode is set as a temporary measure.

On the other hand, when at least one of the control system of the first turning controller 71, the control system of the second turning controller 72, and the control system of the reaction force controller 73 malfunctions, the control mode is switched to any one of the one-motor SBW mode, the one-motor EPS mode and the manual steering mode.

Firstly, it is assumed that the control system of the second turning controller 72 and the control system of the reaction force controller 73 are normal, whereas the control system of the first turning controller 71 malfunctions. In this case, the one-motor SBW mode is set, since only the steering-by-wire function and the electric power steering function by the first actuator A1 malfunctions, but the steering-by-wire function by the second actuator A2 and a reaction force generation function by the reaction force motor 51 are kept normal.

Furthermore, it is assumed that the control system of the first turning controller 71 and the control system of the reaction force controller 73 are normal, whereas the control system of the second turning controller 72 malfunctions. In this case, the one-motor EPS mode is set, since only the steering-by-wire function by the second actuator A2 malfunctions and the electric power steering function by the first actuator A1 is kept normal.

Furthermore, it is assumed that the control system of the first turning controller 71 and the control system of the second turning controller 72 are normal, whereas the control system of the reaction force controller 73 malfunctions. In this case, the one-motor EPS mode is set, since only the reaction force generation function by the reaction force motor 51 malfunctions, but the electric power steering function by the first actuator A1 is kept normal.

Furthermore, it is assumed that the control system of the first turning controller 71 is normal, whereas the control system of the second turning controller 72 and the control system of the reaction force controller 73 malfunction. In this case, the one-motor EPS mode is set, since only the steering-by-wire function by the second actuator A2 and the reaction force generation function by the reaction force motor 51 malfunction, and the electric power steering function by the first actuator A1 is kept normal.

Furthermore, it is assumed that the control system of the reaction force controller 73 is normal, whereas the control system of the first turning controller 71 and the control system of the second turning controller 72 malfunction. In this case, the manual steering mode is set, since the steering-by-wire function and the electric power steering function by the first actuator A1 and the steering-by-wire function by the second actuator A2 malfunction, although the reaction force generation function by the reaction force motor 51 is kept normal.

Furthermore, it is assumed that the control system of the second turning controller 72 is normal, whereas the control system of the first turning controller 71 and the control system of the reaction force controller 73 malfunction. In this case, the manual steering mode is set, since the steering-by-wire function or the electric power steering function by the first actuator A1 and the reaction force generation function by the reaction force motor 51 malfunction, although the steering-by-wire function by the second actuator A2 is kept normal.

Then, it is assumed that all of the control system of the first turning controller 71, the control system of the second turning controller 72, and the control system of the reaction force controller 73 malfunction. In this case, the manual steering mode is set, since all of the steering-by-wire function and the electric power steering function by the first actuator A1, the steering-by-wire function by the second actuator A2, and the reaction force generation function by the reaction force motor 51 malfunction. What is described above is an overview of the fail-safe.

Next, a transition of the control mode will be described. Firstly, when all of the control system of the first turning controller 71, the control system of the second turning controller 72, and the control system of the reaction force controller 73 are normal, the two-motor SBW mode is set basically. Additionally, when a low voltage is applied to the first turning motor M1 and the second turning motor M2, when the first turning motor M1 and the second turning motor M2 are overheated, when an ignition switch is turned on at starting (until the clutch 19 is disengaged), when the turning angle θw reaches the maximum turning angle at end-abutting, or the like, the two-motor EPS mode is set as a temporary measure. Then, when the state in which a low voltage is applied to the first turning motor M1 and the second turning motor M2 or where the first turning motor M1 and the second turning motor M2 are over heated is eliminated, when the clutch 19 is disengaged, or the turning angle θ decreases, the two-motor SBW mode is set. In this way, as long as all of the control system of the first turning controller 71, the control system of the second turning controller 72, and the control system of the reaction force controller 73 function normally, the control mode transits between the two-motor SBW mode and the two-motor EPS mode.

Furthermore, when the malfunction of the control system of the first turning controller 71 occurs as the primary failure in the state of the two-motor SBW mode, the control mode transits into the one-motor SBW mode. Then, when the malfunction of at least one of the control system of the second turning controller 72 or the control system of the reaction force controller 73 occurs as the secondary failure in the state of the one-motor SBW mode, the control mode transits into the manual steering mode. In this way, the control mode does not directly transit from the two-motor SBW mode into the manual steering mode without via the one-motor SBW mode. The transition of the control mode is redundant such that the control mode transits in a stepwise manner depending on the failure level.

Furthermore, when the malfunction of at least one of the control system of the second turning controller 72 and the control system of the reaction force controller 73 occurs as the primary failure in the state of the two-motor SBW mode, the control mode transits into the one-motor EPS mode. Then, when the malfunction of the control system of the first turning controller 71 occurs as the secondary failure in the state of the one-motor EPS mode, the control mode transits into the manual steering mode. In this way, the control mode does not directly transit from the two-motor SBW mode into the manual steering mode without via the one-motor EPS mode. The transition of the control mode is redundant such that the control mode transits in a stepwise manner depending on the failure level.

Furthermore, when the malfunction of at least one of the control system of the second turning controller 72 and the control system of the reaction force controller 73 occurs as the primary failure in the state of the two-motor EPS mode as the temporary measure, the control mode transits into the one-motor EPS mode. Then, when the malfunction of the control system of the first turning controller 71 occurs as the secondary failure in the state of the one-motor EPS mode, the control mode transits into the manual steering mode. In this way, the control mode does not directly transit from the two-motor EPS mode into the manual steering mode without via the one-motor EPS mode. The transition of the control mode is redundant such that the control mode transits in a stepwise manner depending on the failure level.

It is to be noted that when the malfunction of the control system of the first turning controller 71 occurs in the state of the two-motor EPS mode as the temporary measure, the control mode directly transits into the manual steering mode, since the transition into the one-motor EPS mode is not possible. What is described above is the transition of the control mode.

Next, an idle reduction system will be described. The idle reduction (IS) is a function of automatically stopping an engine (stopping an idling) when a vehicle stops at an intersection, by traffic jams, or the like, and of restarting the engine when the vehicle starts moving. The idle reduction is also referred to as "no idle" or an "idling stop".

Figure 2:
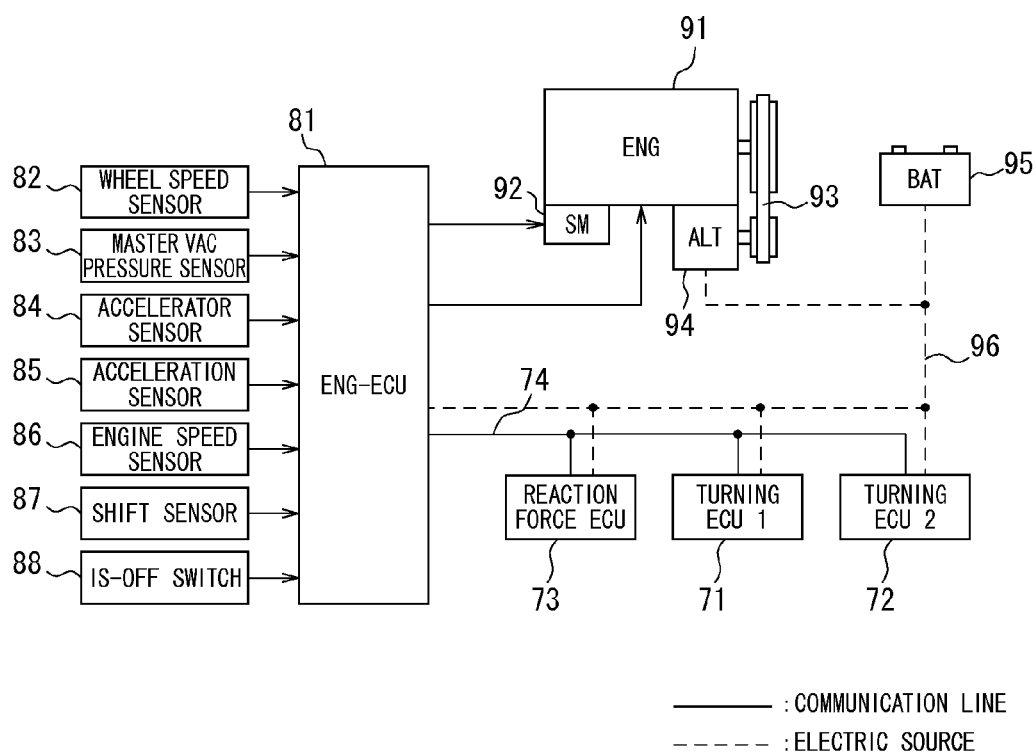
FIG. 2 is a schematic configuration diagram of an idle reduction system.

Herein, a schematic configuration of the idle reduction system will be described. FIG. 2 is a schematic configuration diagram of the idle reduction system. In the idle reduction system, an engine controller (ENG-ECU) 81 is configured to perform the idle reduction control depending on detection values from various sensors. The various sensors include, for example, a wheel speed sensor 82, a master vac pressure sensor 83, an accelerator sensor 84, an acceleration sensor 85, an engine speed sensor 86, a shift sensor 87, an idle reduction OFF switch 88, and the like. Furthermore, the engine controller 81 is connected to other controllers such as the first turning controller 71, the second turning controller 72, the reaction force controller 73, or the like via the communication line 74 to be capable of communicating with them, and for example, also receives a steering angle signal.

The wheel speed sensor 82 is configured to detect wheel speeds $Vw_{FL}$ to $Vw_{RR}$. The wheel speed sensor 82 is configured to, for example, detect magnetic field lines of sensor rotors with detection circuits, and to convert the changes in the magnetic fields associated with the rotations of the sensor rotors into current signals and to output them to the engine controller 81. The engine controller 81 is configured to determine the wheel speeds $Vw_{FL}$ to $Vw_{RR}$ on the basis of the input current signals.

The master vac pressure sensor 83 configured to detect a pressure in a master vac (brake booster) as a brake pedal depression force Pb. The master vac pressure sensor 83 is configured to receive the pressure in the master vac at a diaphragm unit, and to detect a deformation caused in a piezoresistive element via the diaphragm unit as a change in a electric resistance, and to convert the deformation into a voltage signal proportional to the pressure and to output it to the engine controller 81. The engine controller 81 is configured to determine the pressure in the master vac, that is, the brake pedal depression force Pb on the basis of the input voltage signal.

The accelerator sensor 84 is configured to detect a pedal opening degree PPO (operating position) corresponding to a pressed amount of an accelerator pedal. The accelerator sensor 84 may be, for example, a potentiometer, and is configured to convert the pedal opening degree PPO of the accelerator pedal into a voltage signal and to output it to the engine controller 81. The engine controller 81 is configured to determine the pedal opening degree PPO of the accelerator pedal on the basis of the input voltage signal. It is to be noted that the pedal opening degree PPO is 0 percent when the accelerator pedal is at a non-operating position and the pedal opening degree PPO is 100 percent when the accelerator pedal is at a maximum operating position (stroke end).

The acceleration sensor 85 is configured to detect an acceleration/deceleration in front-rear direction of the vehicle. The acceleration sensor 85 is configured to detect a change in the position of a movable electrode with respect to a fixed electrode as a change in an electrostatic capacitance, for example, and to convert it into a voltage signal proportional to the acceleration/deceleration and the direction, and to output it to the engine controller 81. The engine controller 81 is configured to determine the acceleration/deceleration on the basis of the input voltage signal. It is to be noted that the engine controller 81 is configured to treat the acceleration as a positive value and to treat the deceleration a negative value.

The engine speed sensor 86 is configured to detect an engine speed Ne. The engine speed sensor 86, for example, is configured to detect magnetic field lines of a sensor rotor with a detection circuit, and to convert the change in the magnetic fields associated with the rotation of the sensor rotor into a current signal and to output it to the engine controller 81. The engine controller 81 is configured to determine the engine speed Ne on the basis of the input current signals.

The shift sensor 87 is configured to detect a shift position of a transmission. The shift sensor 87, for example, includes plural of Hall devices, and is configured to output respective ON/OFF signals of the Hall devices to the engine controller 81. The engine controller 81 is configured to determine the shift position on the basis of the combination of the input ON/OFF signals.

The idle reduction OFF switch (IS-OFF switch) 88 is configured to detect a cancel operation of the idle reduction system. The idle reduction OFF switch 88 is provided adjacent to a dashboard such that the driver can operate it, and is configured to output a voltage signal depending on the cancel operation to the engine controller 81 via a detection circuit with a normally closed contact. The engine controller 81 is configured to determine whether or not to cancel the idle reduction function on the basis of the input voltage signal.

The engine controller 81 is configured to control stop and restart of an engine 91 by performing a fuel injection control via a fuel injector and an ignition timing control via an ignition coil. Furthermore, the engine controller 81 is configured to control cranking by a starter motor 92, when restarting the engine.

The starter motor 92 includes, for example, a series commutator motor, and is configured to crank the engine 91 by transmitting a torque by engaging a pinion gear of an output shaft with a ring gear of the engine 91. The starter motor 92 includes a solenoid to slide the pinion gear in the axial direction so as to move the pinion gear between a projecting position where the pinion gear engages with the ring gear of the engine 91 and a retreat position where the pinion gear does not engage with the ring gear.

Power of the engine 91 is transmitted to an alternator 94 via a serpentine type V-belt 93. The alternator 94 is configured to generate electricity by the power transmitted via the V-belt 93. A battery 95 is charged by the generated electric power. The battery 95 is configured to supply the electric power to various electric equipment mounted on the vehicle. That is, the battery 95 is configured to supply electric power to the engine controller 81, the starter motor 92, the first turning controller 71, the first turning motor M1, the second turning controller 72, the second turning motor M2, the reaction force controller 73, the reaction force motor 51, and the like. What is described above is the schematic configuration of the idle reduction system.

Next, the outline of the operation of the idle reduction control will be described. In the idle reduction system, for example, when all of the following permission conditions are satisfied, the system is put into a standby state in which the idle reduction is permitted.

IS-OFF switch 88 is not operated (the idle reduction function is ON state).

The state of charge (SOC) of the battery 95 is 70 percent or more.

The shift position is at a range other than an R range.

From the above-mentioned standby state, when all of the following activation conditions are satisfied and, for example, one second has elapsed, the engine 91 is stopped.

The vehicle speed V is 0 km/h.

The accelerator pedal opening degree PPO is 0 percent.

The brake pedal depression force Pb is equal to or greater than 0.8 MPa, for example.

The road surface gradient is equal to or less than 14 percent, for example.

The engine speed Ne is less than 1200 rpm, for example.

In this condition, an average value of the wheel speeds $Vw_{FL}$ to $Vw_{RR}$ or the like is used as the vehicle speed V. Furthermore, the road surface gradient is calculated on the basis of the acceleration/deceleration. It is to be noted that the road surface gradient is calculated as (vertical distance/horizontal distance)×100, and a low pass filtering processing is performed at 1 Hz.

From the above-mentioned stop state, when any of the following restart conditions is satisfied, the engine 91 is restarted.

The steering operation is started in an idle reduction state.
The vehicle speed V is equal to or faster than 2 km/h, for example.
The accelerator pedal opening degree PPO is equal to or greater than 50 percent.
A shift operation from a P range to the R range or a D range is performed.
The shift operation from an N range to the R range or the D range is performed.
The shift operation from the D range to the R range is performed.

The engine controller 81 is configured to output an idle reduction state signal (IS state signal) including an activation state of the idle reduction and a presence or absence of a restart request to the first turning controller 71, the second turning controller 72, and the reaction force controller 73 via the communication line 74. What is described above is the outline of the operation of the idle reduction control.

Figure 3:
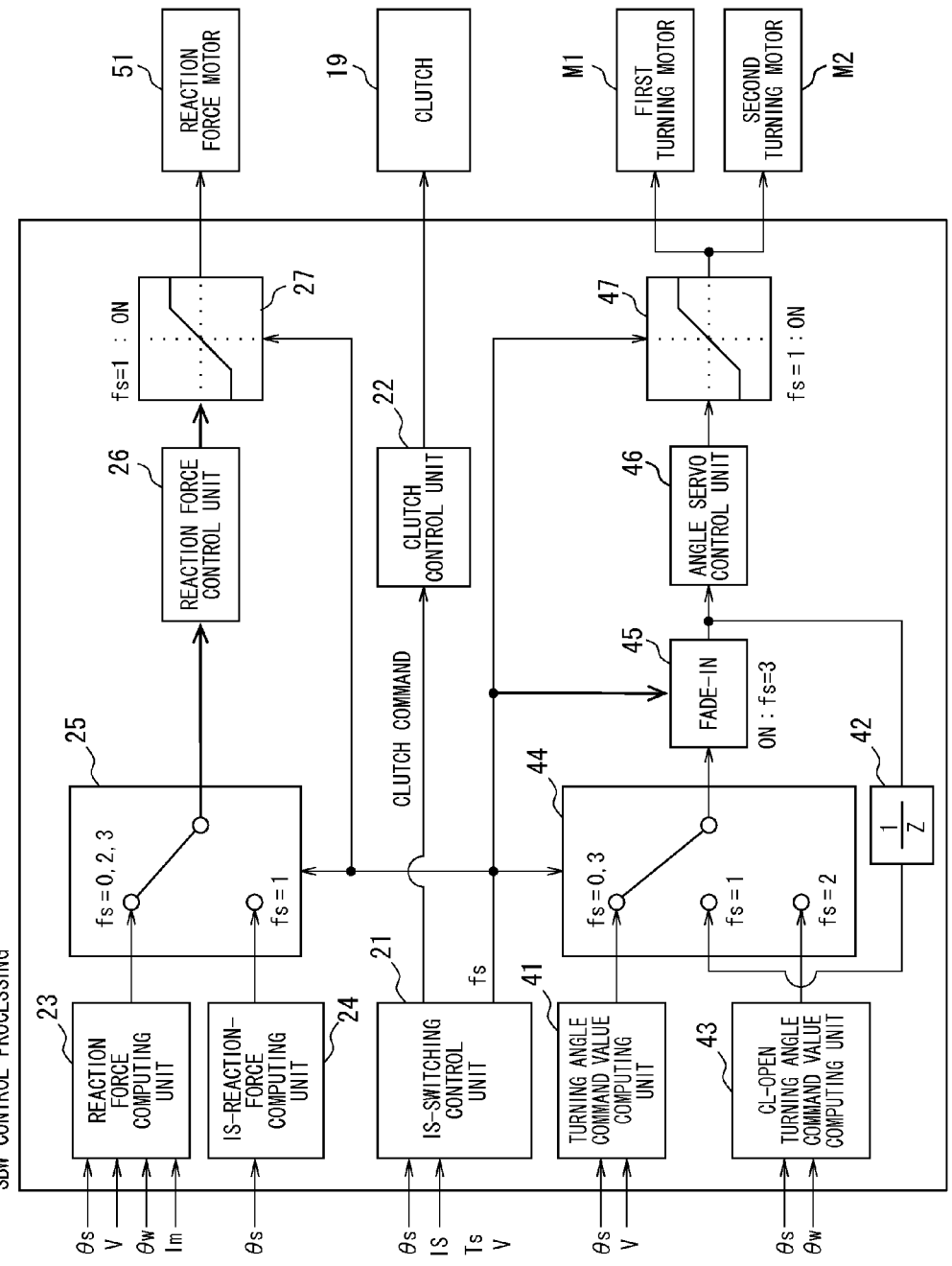
FIG. 3 is a block diagram illustrative of an entire configuration of a steering-by-wire control processing.

Next, steering-by-wire control processing related to the idle reduction system will be described. FIG. 3 is a block diagram illustrative of an entire configuration of the steering-by-wire control processing.

The steering-by-wire control processing is individually computed in each of the first turning controller 71, the second turning controller 72, and the reaction force controller 73, and when the results of the computing by the respective controller coincide with one another, the control of the driving is permitted to be executed. It is to be noted that, as described above, the first turning controller 71 is configured to perform the control of the driving of the first turning motor M1, the second turning controller 72 is configured to perform the control of the driving of the second turning motor M2, and the reaction force controller 73 is configured to perform the control of the driving of the reaction force motor 51.

The steering-by-wire control processing includes an IS-switching control unit 21, a clutch control unit 22, a reaction force computing unit 23, an IS-reaction-force computing unit 24, a reaction force switch unit 25, a reaction force control unit 26, a limiter processing unit 27, a turning angle command value computing unit 41, a previous value storing unit 42, a CL-open turning angle command value computing unit 43, a turning angle command value switching unit 44, a fade-in control processing unit 45, an angle servo control unit 46, and a limiter processing unit 47.

The IS-switching control unit 21 is configured to perform IS-switching control processing described below to output a clutch command for controlling the disengagement and engagement of a clutch 19, as well as to output a switching flag fs for switching a reaction force control characteristic and a turning angle control characteristic. The switch flag fs is switched within a range of 0 to 3. In a case of fs=0, an ordinary reaction force control characteristic and an ordinary turning angle control characteristic are used. In a case of fs=1, a reaction force control characteristic and a turning angle control characteristic when the idle reduction is activated are used. Furthermore, in a case of fs=2, a turning angle control characteristic when the clutch is disengaged and the ordinary reaction force control characteristic are used. In a case of fs=3, a turning angle control characteristic when the engine is restarted from the idle reduction and the ordinary reaction force control characteristic are used.

The clutch control unit 22 is configured to disengage or engage the clutch 19 in accordance with the clutch command from the IS-switching control unit 21.

The reaction force computing unit 23 is configured to set an ordinary target reaction force torque $Tr_N$ corresponding to a reaction force received from a road surface against the steering operation and output it, when performing any of the two-motor SBW mode and the one-motor SBW. Note that the reaction force received from the road surface is determined on the basis of the steering angle $\theta s$, the vehicle speed V, the turning angle $\theta w$, the current $Im1$ flowing the first turning motor M1, the current $Im2$ flowing the second turning motor M2, and the like.

The IS-reaction-force computing unit 24 is configured to set and output a target reaction force $Tr_{IS}$ to be generated at the time of the idle reduction by a method different from that of the reaction force computing unit 23, when the idle reduction is activated. In this example, the target reaction force $Tr_{IS}$ is set to a torque within a range smaller than the target reaction force torque $Tr_N$ and capable of preventing the steering wheel 11 from rotating by its weight because of balance of the center, even if the driver releases his or her hand from the steering wheel 11. Specifically, the target reaction force $Tr_{IS}$ is set on the basis of at least one of a spring resistance depending on the steering angle $\theta s$ and a viscous resistance depending on the steering angle speed $\theta s'$.

The reaction force switch unit 25 is configured to switch a reaction force torque to be output as a final target reaction force torque $Tr^*$ between the target reaction force $Tr_N$ computed by the reaction force computing unit 23 and the target reaction force $Tr_{IS}$ computed by the IS-reaction-force computing unit 24 depending on the switching flag fs, and to output the final target reaction force torque $Tr^*$. Specifically, when the switching flag fs is any one of "0", "2", and "3", the target reaction force $Tr_N$ is selected as the final target reaction force torque $Tr^*$. When the switching flag fs is "1", the target reaction force $Tr_{IS}$ is selected as the final target reaction force torque $Tr^*$.

The reaction force control unit 26 is configured to compute a current command value for the reaction force motor 51 in order to generate the target reaction force torque $Tr^*$, and to control the driving of the reaction force motor 51 on the basis of the current command value. In this example, the reaction force control unit 26 is configured to calculate the current command value on the basis of reaction force servo control including feed-forward control, feedback control, and robust compensation.

The limiter processing unit 27 is configured to perform limiter processing on the current command value for the reaction force motor 51 depending on the switching flag fs. Specifically, when the switching flag fs is "1", the limiter processing unit 27 performs the limiter processing on the current command value, otherwise, that is when the switching flag fs is any one of "0", "2", and "3", the limiter processing unit 27 does not perform the limiter processing on the current command value.

The turning angle command value computing unit 41 is configured to set and output an ordinary target turning angle $\theta w_N$ for the turning angle $\theta s$, when performing any of the two-motor SBW mode and the one-motor SBW. Note that the ordinary target turning angle $\theta w_N$ is set on the basis of the steering angle $\theta s$ and a turning angle ratio depending on the vehicle speed V.

The previous value $\theta w^*_{(n-1)}$ of the target turning angle $\theta w^*$ is stored in the previous value storing unit 42 and is output therefrom.

The CL-open turning angle command value computing unit 43 is configured to set and output a target turning angle $\theta w_{CL}$ to be used in a state in which the clutch is disengaged by a method different from that of the turning angle command value computing unit 41, when disengaging the clutch 19 which has been in a engaged state, in order to quickly and surly disengage it. In this example, a turning angle is set such that a change gradient in the turning angle $\theta w$ coincides with a change gradient in the steering angle $\theta s$, firstly. Then, the turning angle set as above is corrected so as to reduce the steering torque. The corrected turning angle is set as the target turning angle $\theta w_{CL}$. Specifically, a difference $\Delta\theta$ $(=\theta s-\theta w)$ between the steering angle $\theta s$ and the turning angle $\theta w$ is calculated and a turning angle $\theta d$ $(\theta d=\theta s-\Delta\theta)$ is set to a value obtained by subtracting the difference $\Delta\theta$ from the steering angle $\theta s$. Then, a correction amount $\theta t$ for reducing (cancelling) the steering torque Ts is set to a value obtained by multiply the steering torque Ts by a preset gain. Then, the target turning torque $\theta w_{CL}$ is set to a value obtained by adding the correction amount $\theta t$ to the turning angle $\theta d$. In this way, the steering shaft 12 and the first pinion shaft 18 move in a similar manner after outputting an engaging command for the clutch 19, and thus it is possible to suppress an increase of the steering torque Ts. Therefore, it is possible to suppress the increase in an engaging force of a roller in a cam roller mechanism included in the engine 91, and thus the clutch 19 is easily disengaged.

The turning angle command value switching unit 44 is configured to switch a steering angle to be output as a final target turning angle $\theta w^*$ between the target turning angle $\theta w_N$ computed by the turning angle command value computing unit 41, the previous value $\theta w^*_{(n-1)}$ stored in the previous value storing unit 42, the target turning angle $\theta w_{CL}$ computed by the CL-open turning angle command value computing unit 43 depending on the switching flag fs, and to output the final target turning angle $\theta w^*$. Specifically, when the switching flag fs is any one of "0" and "3", the target turning angle $\theta w_N$ is selected as the final target turning angle $\theta w^*$. When the switching flag fs is "1", the previous value $\theta w^*_{(n-1)}$ is selected as the final target turning angle $\theta w^*$. Furthermore, when the switching flag fs is "2", the target turning angle $\theta w_{CL}$ is selected as the final target turning angle $\theta w^*$.

The fade-in control processing unit 45 is configured to perform a fade-in processing on the final target turning angle $\theta w^*$, depending on the switching flag fs. The fade-in processing gradually changes the target steering angle so as to reach the original value $\theta w^*$ while a predetermined fade-in time TF has elapsed, and serves like a rate limiter for suppressing a sudden change in the target turning angle $\theta w^*$. Specifically, on the basis of the number of computing executed in the fade-in time TF, an amount of change of the turning angle to be changed per one computing is set, and the target turning angle $\theta w^*$ is changed by the amount of change. In this example, when the switching flag fs="2", the fade-in processing on the target turning angle $\theta w^*$ is performed, and when the switching flag fs="0", "1", or "3", the fade-in processing on the target turning angle $\theta w^*$ is not performed.

The angle servo control unit 46 is configured, in the two-motor SBW mode, to compute the current command values for the first turning motor M1 and for the second turning motor M2 to obtain the target turning angle $\theta w^*$, and to control the driving of the first turning motor M1 and the second turning motor M2 on the basis of the current command values. Furthermore, the angle servo control unit 46 is configured, in the one-motor SBW mode, to compute the current command value for the second turning motor M2 to obtain the target turning angle $\theta w^*$, and to control the driving of the second turning motor M2 on the basis of the current command value. In this example, the angle servo control unit 46 is configured to calculate the current command value on the basis of reaction force servo control including feed-forward control, feedback control, and robust compensation.

The limiter processing unit 47 is configured, in the two-motor SBW mode, to perform the limiter processing on the current command values for the first turning motor M1 and the second turning motor M2 depending on the switching flag fs. In this example, the limiter processing unit 47 is configured to perform the limiter processing such that the power consumption of the first turning motor M1 and the second turning motor M2 is smaller than the power consumption of the reaction force motor 51. Furthermore, the limiter processing unit 47 is configured, in the one-motor SBW mode, to perform the limiter processing on the current command value for the second turning motor M2 depending on the switching flag fs. In this example, the limiter processing unit 47 is configured to perform the limiter processing such that the power consumption of the second turning motor M2 is smaller than the power consumption of the reaction force motor 51. In both cases, when the switching flag fs="1", the limiter processing on the current command value is performed, otherwise, that is when the switching flag fs="0", "2", or "3", the limiter processing on the current command value is not performed. What is described above is the entire configuration of the steering-by-wire control processing.

Figure 4:
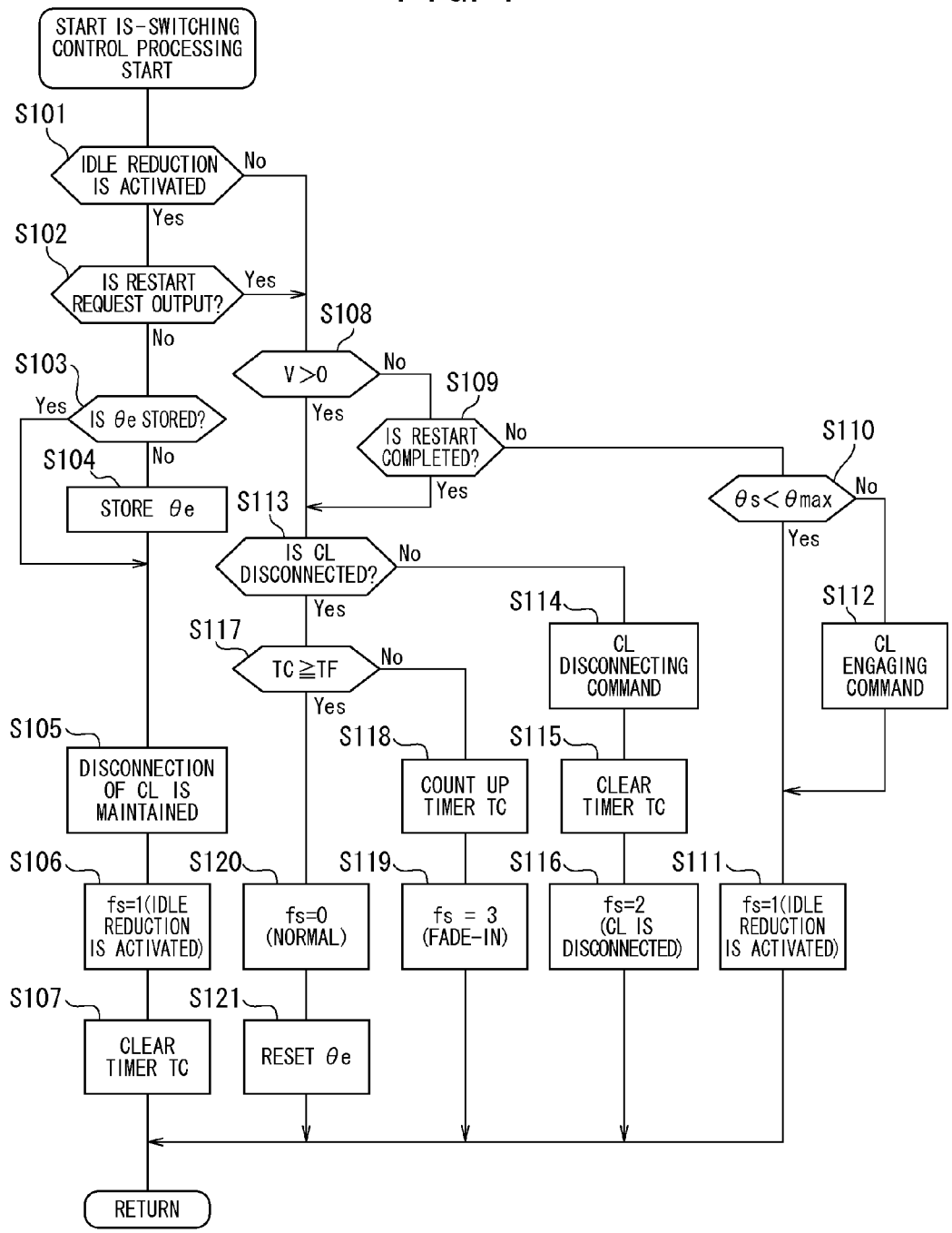
FIG. 4 is a flowchart illustrative of IS-switching control processing.

Next, the IS-switching control processing will be described. The IS-switching control unit 21 is configured to perform the IS-switching control processing at every predefined time (for example, 5 msec). FIG. 4 is a flowchart illustrative of the IS-switching control processing.

First, in step S101, it is determined whether or not the idle reduction is activated. When the idle reduction is activated, the processing proceeds to step S102. On the other hand, when the idle reduction is not activated, the processing proceeds to step S108.

In step S102, it is determined whether or not the restart request of the engine 91 is output after the idle reduction is activated. When the restart request is not output, the processing proceeds to step S103. On the other hand, when the restart request is output, the processing proceeds to step S108.

In step S103, an IS initial steering angle $\theta e$ is set to the steering angle $\theta s$ at the time of activating the idle reduction, and it is determined whether or not the IS initial steering angle $\theta e$ is stored. When the IS initial steering angle $\theta e$ is not stored, it is determined that it is just after the idle reduction was activated, and the processing proceeds to step S104. On the other hand, when the IS initial steering angle $\theta e$ is stored, it is determined that it is not just after the idle reduction was activated, and the processing proceeds to step S105.

In step S104, the steering angle $\theta s$ is stored as the IS initial steering angle $\theta e$, and then the processing proceeds to step S105.

In step S105, the disengaged state of the clutch 19 is maintained.

In step S106, the switching flag fs is set to "1", and is output. In this way, the steering-by-wire control is performed according to the reaction force control characteristic and the turning angle control characteristic to be used when the idle reduction is activated.

In step S107, the timer TC is cleared to "0", and then, the processing returns to a predetermined main program.

In step S108, it is determined whether or not the vehicle speed V is faster than 0. When it is determined that V=0, it is determined that the vehicle is stopped and the processing proceeds to step S109. On the other hand, it is determined that V>0, it is determined that the vehicle is moving or travelling, and the processing proceeds to step S113.

In step S109, it is determined whether or not the restart of the engine 91 is completed. When the restart of the engine 91 is not completed, the processing proceeds to step S110. On the other hand, when the restart of the engine 91 is completed, the processing proceeds to step S113.

In step S110, it is determined whether or not the steering angle θs is smaller than a maximum steering angle θmax corresponding to a maximum turning angle defined structurally. When it is determined that θs<θmax, it is determined that an increase in the steering angle θs is allowable, and the processing proceeds to step S111. On the other hand, when it is determined that θs≥θmax, it is determined that the increase in the steering angle θs is not allowable, and the processing proceeds to step S112.

In step S111, the switching flag fs is set to "1" and is output. Then, the processing returns to a predetermined main program. In this way, the steering-by-wire control is performed according to the reaction force control characteristic and the turning angle control characteristic to be used when the idle reduction is activated.

In step S112, the engaging command for the clutch 19 is output. Then the processing proceeds to step S111.

In step S113, it is determined whether or not the clutch 19 is disengaged. When the clutch 19 is not disengaged, the processing proceeds to step S114. On the other hand, when the clutch 19 is disengaged, the processing proceeds to step S117.

In step S114, the disengaging command for the clutch 19 is output.

In step S115, the timer TC is cleared to "0".

In step S116, the switching flag fs is set to "2" and is output. Then the processing returns to a predetermined main program. In this way, the steering-by-wire control is performed according to the turning angle control characteristic to be used when the clutch 19 is disengaged and the ordinary reaction force control characteristic.

In step S117, it is determined whether or not the timer TC is equal to or greater than the fade time TF. When it is determined that TC<TF, it is determined that the fade-in time TF has not elapsed, and the processing proceeds to step S118. On the other hand, when it is determined that TC≥TF, it is determined that the fade-in time TF has elapsed, and the processing proceeds to step S120.

In step S118, the timer TC is counted up.

In step S119, the switching flag fs is set to "3" and is output. Then the processing returns to a predetermined main program. In this way, the steering-by-wire control is performed according to the turning angle control characteristic to be used when being restarted from the idle reduction state and the ordinary reaction force control characteristic.

In step S120, the switching flag fs is set to "0" and is output. In this way, the steering-by-wire control is performed according to the ordinary reaction force control characteristic and the ordinary turning angle control characteristic.

In step S121, the stored IS initial steering angle θe is reset, and then processing returns to a predetermined main program. What is described above is the IS-switching control processing.

(Operation)

Next, the operation of the first embodiment will be described. In the present embodiment, there is provided the first turning motor M1 and the second turning motor M2 capable of providing the driving force to the turning output mechanism $St_{OUT}$ to perform the two-motor SBW mode in which the wheels 13L and 13R are turned by these two motor. Thus, the intended steering characteristics as the steering-by-wire function are achieved. Furthermore, by adopting the configuration in which the wheels 13L and 13R are turned by the two motor, it is possible to share the needed driving force for the turning output mechanism $St_{OUT}$. Therefore, it is possible to suppress the increasing in the size of the motor and is excellent in the layout characteristics in comparison with a configuration in which the wheels 13L and 13R are turned by one motor.

Furthermore, in the configuration in which the wheels 13L and 13R are turned by the two motors, even if any one of the control systems malfunctions, it is possible to utilize the other control system which does not malfunction. That is, it is possible to perform the one-motor SBW mode or the one-motor EPS mode as the fail-safe for the primary failure in which only any one of the control systems malfunctions. In this way, even if any one of the control systems malfunctions, the other control system which does not malfunction is utilized. Thus, it is possible to achieve a fail-safe capable of fully utilizing the advantage of the provision of two motors. Furthermore, it is possible to perform the manual steering mode as a fail-safe against the secondary failure, in which the other control system malfunctions despite the fail-safe against the primary failure. In this way, the steering system is connected mechanically to ensure the direct steering operability.

In addition, in each of the two-motor SBW mode and the one-motor SBW mode, the clutch 19 is disengaged to perform the steering-by-wire when the engine 91 is in a working state. The clutch 19 maintains the engaged state when it is not excited (not energized). Thus, when turning off the ignition to stop the engine 91 which has been in the working state, the clutch 19 is engaged. An operating sound of clutch engagement when turning off the ignition is hardly noticed, since it is caused in the scene of getting off the vehicle and since it blends into various noises caused for getting off the vehicle, such as a sound of releasing a door lock or the like. On the other hand, in the state of idle reduction, the noise is expected to be smaller than that in the scene of getting off the vehicle, thus the operating sound of clutch engagement may attract attention.

Therefore, when the engine 91 which has been in the working state is stopped by the idle reduction function (determined as "Yes" in step S101) and the start request is not output (determined as "No" in step S102), the disengaged state of the clutch 19 is maintained (step S105). In this way, when the engine 91 which has been in the working state is stopped by the idle reduction function, the disengaged state of the clutch 19 is maintained. Therefore, it is possible to suppress the operating sound caused when engaging the clutch 19. Thus, it is possible to improve silence in the vehicle interior space in the idle reduction state.

It is to be noted that it is necessary to excite the clutch 19 in order to maintain the disengaged state of the clutch 19, and thus electric power is consumed for that. However, since the idle reduction is activated at higher frequency than that of turning ON/OFF of the ignition, when the clutch 19 is repeatedly disengaged and engaged every time the idle reduction is activated, durability of the clutch 19 is affected by the excessive number of operations. Therefore, by maintaining the disengaged state of the clutch 19 when the engine 91 which has been in the working state is stopped by the idle reduction function, it is possible to suppress the number of operations of disengaging and engaging the clutch 19, and thus, it is also advantageous in respect of durability.

In addition, the steering-by-wire consumes electric power for turning the wheels by the first turning motor M1 and the second turning motor M2 and for generating a steering reaction force by the reaction force motor 51. However, the alternator 94 is stopped in the idle reduction state. Thus, in a case of an ordinary engine vehicle other than a hybrid vehicle, that is, a vehicle on which a large battery and a DC-DC converter are not mounted, available electric power is limited. Therefore, when the steering-by-wire is performed ordinarily in the idle reduction state, the voltage of the battery 95 may drop, and the other electric system may be affected.

A time chart of the above-mentioned events will be described as the first comparative example relative to the present embodiment.

Figure 5:
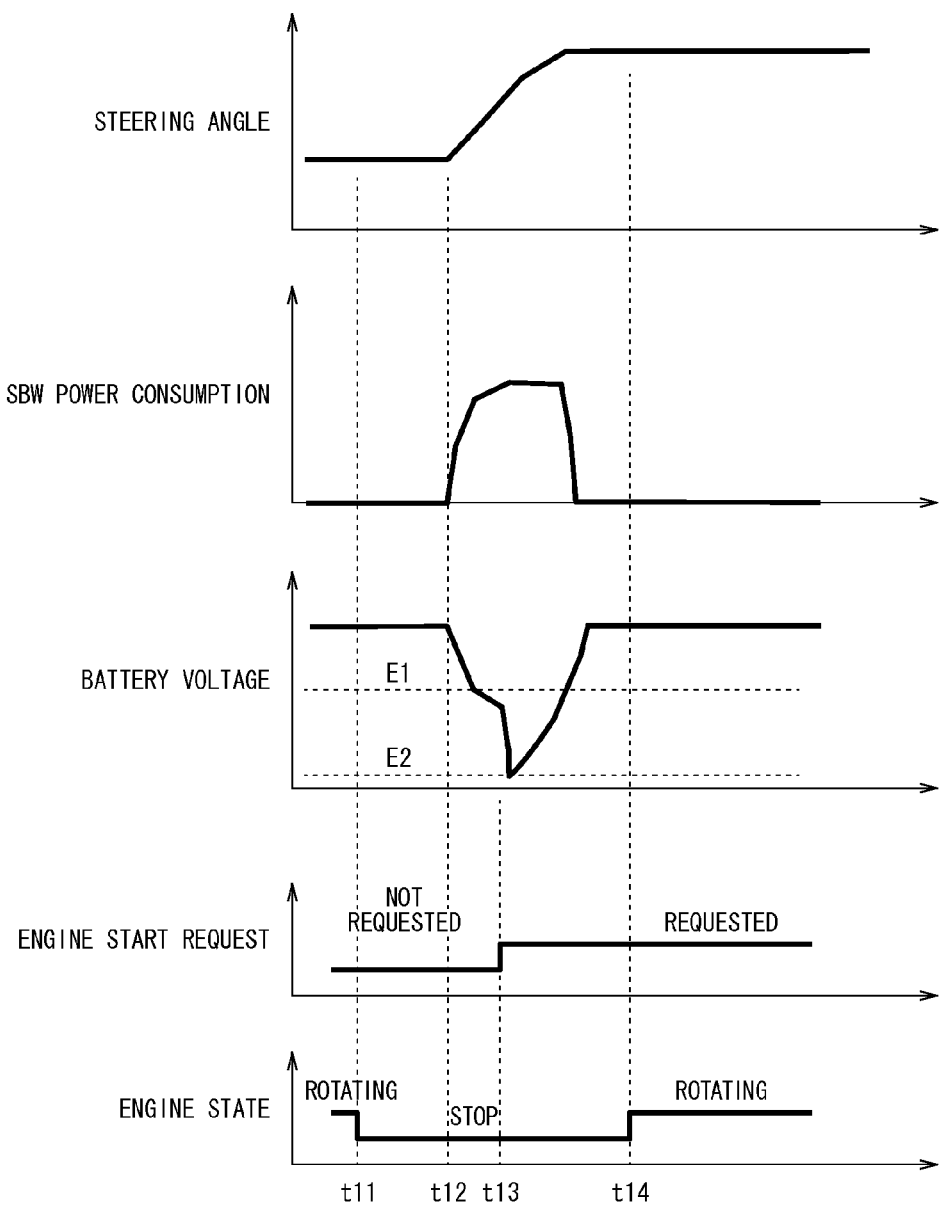
FIG. 5 is a time chart illustrative of the first comparative example.

FIG. 5 is a time chart illustrative of the first comparative example. At time t11, the idle reduction is activated, and at time t12, the steering operation is started. In this situation, when the steering-by-wire is performed ordinarily, since its power consumption increases, the voltage of the battery 95 is reduced. When the voltage becomes lower than E1, brightness of the headlight is reduced, for example.

When the steering operation is started at time t13, since the start request of the engine 91 is output and the cranking is started, the voltage of the battery 95 is further reduced. When the voltage becomes lower than E2 which is lower than E1, a display of a navigation system is turned off, for example. The engine 91 actually restarted at time t14, the other electric system is affected by a voltage drop of the battery 95 until that time.

In the present embodiment, when the engine 91 which has been in the working state is stopped by the idle reduction function (determined as "Yes" in step S101) and the start request is not output (determined as "No" in step S102), the switching flag is set to "1" (step S106). In this way, the limiter processing unit 27 performs the limiter processing on the current command value for the reaction force motor 51, and the limiter processing unit 47 performs the limiter processing on the current command values for the first turning motor M1 and the second turning motor M2. Therefore, it is possible to suppress the power consumption by the steering-by-wire. Thus it is possible to suppress the voltage drop of the battery 95.

A time chart of the above-mentioned events will be described as the first example of operation of the present embodiment.

Figure 6:
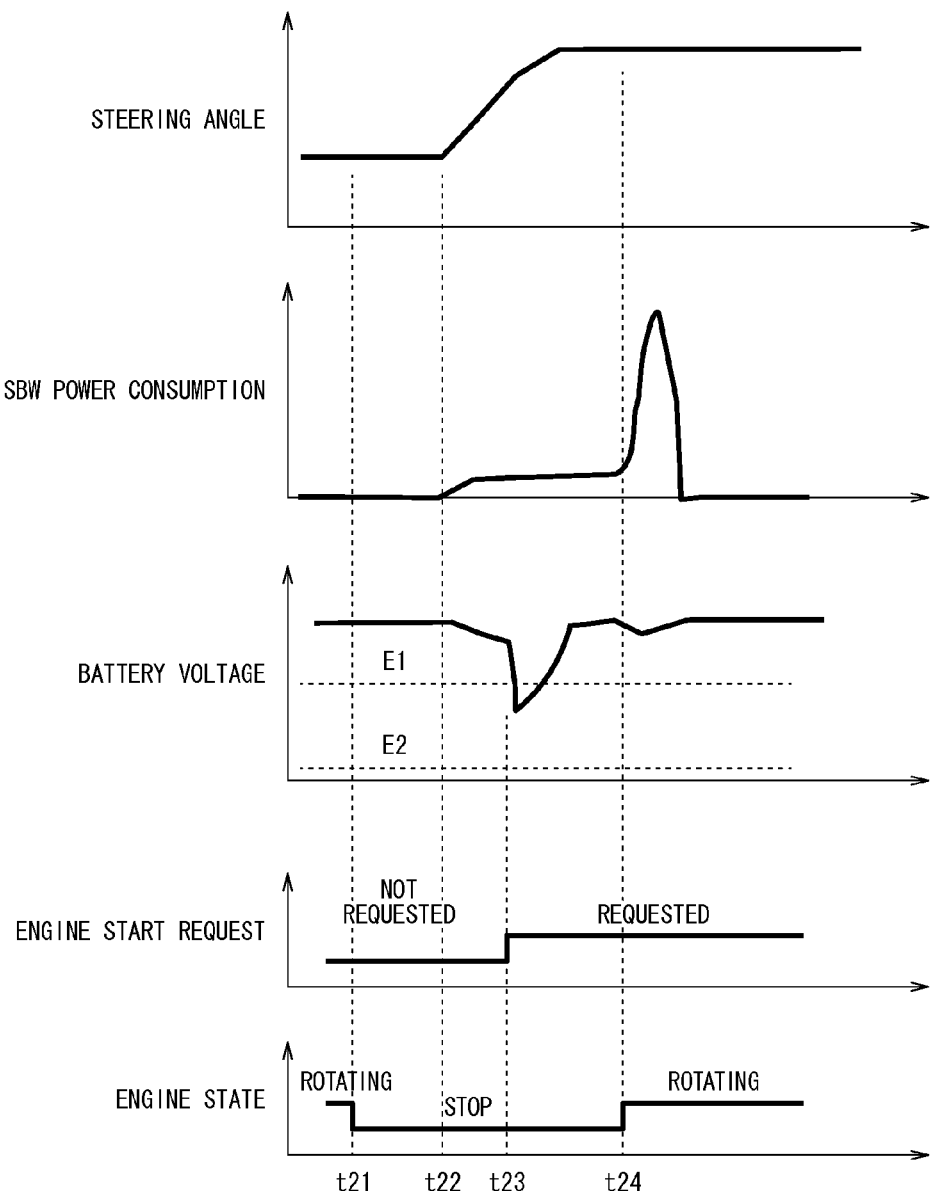
FIG. 6 is a time chart illustrative of the first example of operation.

FIG. 6 is a time chart illustrative of the first example of operation. At time t21, the idle reduction is activated, and at time t22, the steering operation is started. In this situation, since the power consumption by the steering-by-wire is suppressed, it is possible to suppress the voltage drop of the battery 95. In this example, since the voltage does not becomes lower than E1 by merely starting the steering operation. Thus, brightness of the headlight is not reduced, for example.

When the start request of the engine 91 is output at time t23, since the cranking is started, the voltage of the battery 95 is reduced, but does not become lower than E2. Therefore, the display of the navigation system is not turned off, for example.

The engine 91 is actually restarted at time 24, and it is possible to suppress the voltage drop of the engine 91 until that time. Therefore, it is possible to suppress an influence on the other electric system.

It is to be noted that when suppressing the power consumption by the steering-by-wire, the limiter processing is performed such that the power consumption by the first turning motor M1 and the second turning motor M2 are smaller than the power consumption by the reaction force motor 51. This is because there is no great influence even if the turning angle control is restricted since the vehicle is stopped in the idle reduction state, but the excessive restriction of the steering reaction force puts the steering wheel 11 into a state in which the steering wheel easily rotates. That is, the steering wheel 11 may rotate by its weight depending on the balance of the center thereof when the driver releases his or her hand from the steering wheel 11. This may give an odd feeling to the driver. Therefore, by performing the limiter processing such that the power consumption by the first turning motor M1 and the second turning motor M2 are smaller than the power consumption by the reaction force motor 51, it is possible to maintain a good operation feeling.

Furthermore, when the restart request is output by the idle reduction function (determined as "Yes" in step S102) and when the restart is actually completed (determined as "Yes" in step S109), the switching flag fs is set to "0" (step S120). In this way, the limiter processing unit 27 cancels (stops) the limiter processing on the current command value for the reaction force motor 51, and the limiter processing unit 47 cancels (stops) the limiter processing on the current command values for the first turning motor M1 and the second turning motor M2. In this way, it is possible to return to the ordinary steering-by-wire and to achieve the intended steering characteristics.

Furthermore, when the vehicle moves due to, for example, the road surface gradient in the idle reduction state (determined as "Yes" in step S108), the switching flag fs is set to "0" (step S120). That is, the restriction of the driving of the reaction force motor 51, and the restriction of the driving of the first turning motor M1 and the second turning motor M2 are canceled. This is because there is no great influence even if the turning angle control is restricted since the vehicle is stopped, but when the vehicle starts to move, the turning angle control becomes important in order to ensure the control performance of the vehicle. Therefore, by returning to the ordinary steering-by-wire immediately, it is possible to suppress that the driver feels uneasy.

As described above, the excessive restriction of the steering reaction force puts the steering wheel 11 into the state in which the steering wheel easily rotates. When the driver releases his or her hand from the steering wheel 11 in this situation, the steering wheel 11 may rotate by its weight depending on the balance of the center thereof. This may give an odd feeling to the driver.

A time chart of the above-mentioned events will be described as the second comparative example relative to the present embodiment.

Figure 7:
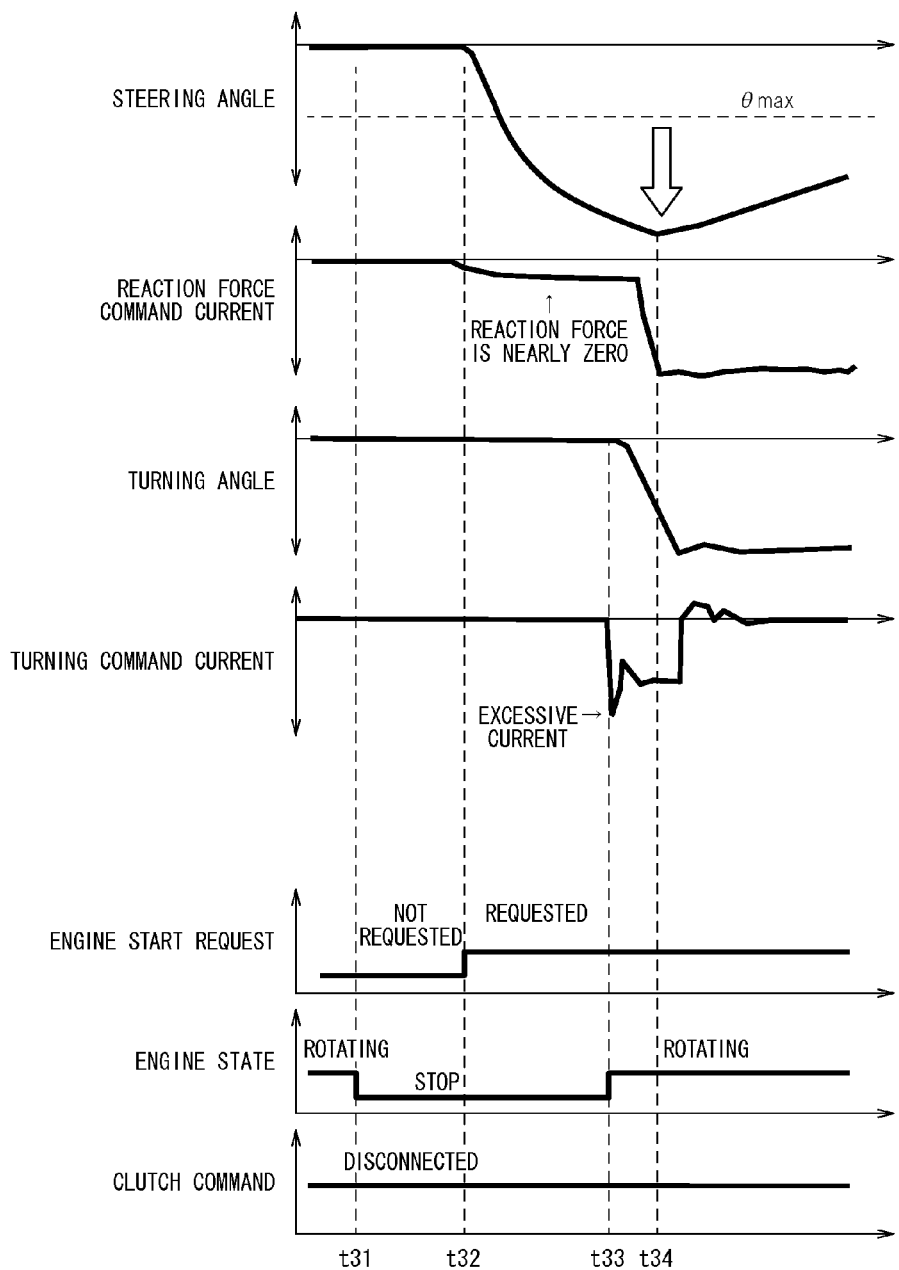
FIG. 7 is a time chart illustrative of the second comparative example.

FIG. 7 is a time chart illustrative of the second comparative example. When the idle reduction is activated at time t31 and the steering operation is started at time t32, the restart request is output accordingly. In this situation, since the steering reaction force is nearly "0", the steering wheel 11 easily rotates and its rotation angle substantially exceeds the maximum steering angle θmax corresponding to the maximum turning angle defined structurally. In this way, when the reaction force is excessively restricted, the reaction force is lost. When the steering wheel 11 is put into a state in which it is freely rotated, the driver may feel uneasy.

When the engine 91 is restarted at time t33, the ordinary steering-by-wire is performed again. In this situation, since the gap between the steering angle θs and the turning angle θw is large, the turning angle command current for correcting the turning angle θw suddenly rises.

At time t34, the ordinary steering reaction force rises to return the steering angle θs which was excessively rotated beyond the maximum steering angle θmax. This may give an odd feeling to the driver.

In the present embodiment, when the engine 91 which has been in the working state is stopped by the idle reduction function (determined as "Yes" in step S101) and the start request is not output (determined as "No" in step S102), the switching flag is set to "1" (step S106). In this way, the reaction force switch unit 25 switches from the ordinary target reaction force torque $Tr_N$ to the target reaction force torque $Tr_{IS}$ to be used in the idle reduction state. This target reaction force torque $Tr_{IS}$ is a torque within a range smaller than the ordinary target reaction force torque $Tr_N$ and capable of preventing the steering wheel 11 from rotating by its weight because of balance of the center, even if the driver releases his or her hand from the steering wheel 11. Therefore, it is possible to suppress the voltage drop of the battery 95 in the idle reduction state. Furthermore, since the steering reaction force is not restricted excessively, it is possible to suppress degradation of the operation feeling.

A time chart of the above-mentioned events will be described as the second example of operation of the present embodiment.

Figure 8:
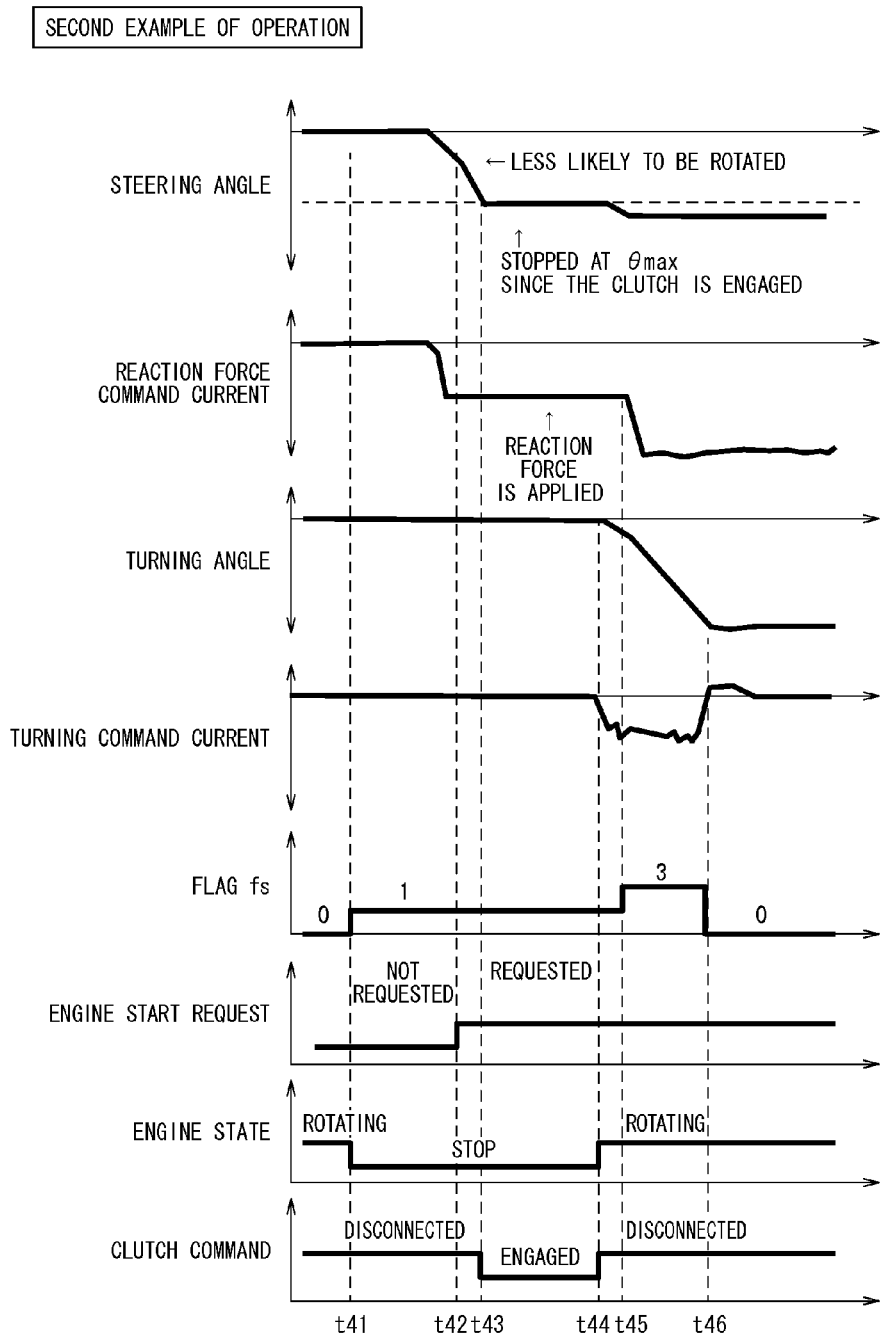
FIG. 8 is a time chart illustrative of the second example of operation.

FIG. 8 is a time chart illustrative of the second example of operation. When the idle reduction is activated at time t41, the switching flag fs is set to "1". Thus, the turning angle command value switching unit 44 latches the previous value of the turning angle $θw*_{(n-1)}$, that is the turning angle at the time of activating the idle reduction. Therefore, it is possible to suppress the power consumption at the first turning motor M1 or the second turning motor M2. Furthermore, by latching the turning angle θw in this way, it is possible to avoid a situation in which the integrated value of the angle servo control unit 46 is accumulated to cause an excessive current to flow and thus an abnormal noise is generated when returning to the ordinary steering-by-wire after the restriction is canceled.

When the steering operation is started, the restart request is output at time t42, and the target reaction force torque $Tr_{IS}$ at the time of the idle reduction is switched to be used. Thus, the steering wheel 11 becomes less likely to be rotated and the steering angle θs changes gradually. Furthermore, the target reaction force torque $Tr_{IS}$ is set on the basis of at least one of the spring resistance depending on the steering angle θs and the viscous resistance depending on the steering angle speed θs'. Therefore, it is possible to obtain a good operation feeling. It is to be noted that the reason why the ordinary target reaction force torque $Tr_N$ is replaced by the target reaction force torque $Tr_{IS}$ is because the ordinary target reaction force torque $Tr_N$ itself is greatly restricted. That is, by latching the turning angle θw to restrict the driving of the first turning motor M1 and the second turning motor M2, the target reaction force torque $Tr_N$ calculated on the basis of the turning current Im is also greatly restricted.

At the time t43, when the steering angle θs reaches the maximum steering angle θmax (determined as "No" in step S110), the clutch 19 is engaged (step S112), and thus the steering angle θs does not substantially exceed the maximum steering angle θmax and stops at nearly the maximum steering angle. Therefore, the steering angle θs is not substantially returned after returning to the ordinary steering-by-wire.

When the restart of the engine 91 is completed (determined as "Yes" in step S109) at time t44, the disengaging command for the clutch 19 is output (step S114) in order to return to the ordinary steering-by-wire.

At time t45, the disengagement of the clutch 19 is completed (determined as "Yes" in step S113), the switching flag fs is set to "3" (step S119). In this way, the reaction force switch unit 25 switches the target reaction force torque to be output from the target reaction torque $Tr_{IS}$ to the ordinary reaction force torque $Tr_N$, and thus an ordinary steering reaction force rises. Furthermore, the turning angle command value switching unit 44 switches the target turning angle to be output from the previous value of the turning angle $θw*_{(n-1)}$ to the ordinary turning angle $θw_N$.

Here, the turning angle control is performed so as to obtain the turning angle θw corresponding to steering angle θs. The turning angle control is slowly performed so as to take the predetermined fade-in time TF. Therefore, it is possible to suppress a sudden rise in the turning current command and the sudden change in the turning angle θw. Thus, it is possible to suppress swing of the vehicle body and generation of the abnormal noise.

When the fade-in time TF is over (determined as "Yes" in step S117) at time t46, since the turning angle θw corresponding to steering angle θs is obtained, the switching flag fs is set to "0" (step S120) In this way, it is possible to return to the ordinary steering-by-wire and to achieve the intended steering characteristics. What is described above is the description of the second example of operation.

As described above, since the turning angle θw is latched in the idle reduction state, if the steering operation is performed at this time period, a gap is generated in the relation between the turning angle θw and the steering angle θs. In this case, the turning angle θw is corrected after returning to the ordinary steering-by-wire in association with the restart of the engine 91. It is desirable to correct slowly in general, steering performance may be degraded in a case the gap is large. Additionally, when the correcting rate is too fast, the swing of the vehicle body and the abnormal noise may occur.

Figure 9:
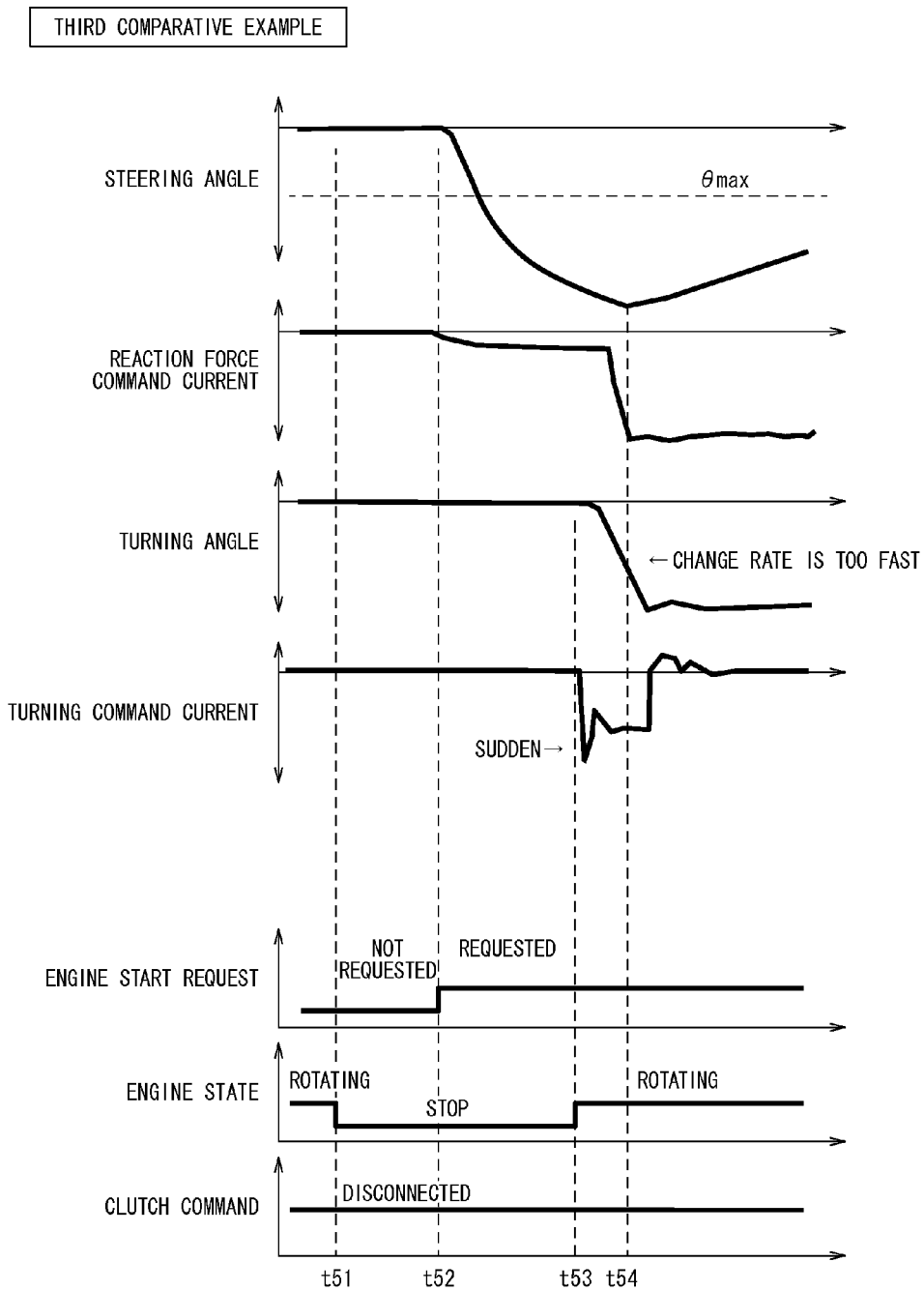
FIG. 9 is a time chart illustrative of the third comparative example.

A time chart of the above-mentioned events will be described as the third comparative example relative to the present embodiment. FIG. 9 is a time chart illustrative of the third comparative example.

When the idle reduction is activated at time t51 and the steering operation is started at time t52, the restart request is output accordingly. In this situation, since the steering reaction force is nearly "0", the steering wheel 11 easily rotates and its rotation angle substantially exceeds the maximum steering angle θmax corresponding to the maximum turning angle defined structurally.

When the engine 91 is restarted at time t53, the ordinary steering-by-wire is performed again. In this situation, since the gap between the steering angle θs and the turning angle θw is large, the turning angle command current for correcting the turning angle θw suddenly rises. Therefore, the correcting rate of the turning angle θw is too fast, the swing of the vehicle body and the abnormal noise may occur. At the time t54, the ordinary steering reaction force rises to reduce the steering angle θs which has been rotated excessively.

In the present embodiment, when the engine 91 is restarted by the idle reduction function (determined as "Yes" in step S109), the restriction of the driving of the turning motor and the driving of the reaction force motor is canceled. When the steering angle θs is changed while the engine 91 is in a stop state and thus a gap is generated between the turning angle θw and the steering angle, the first turning motor M1 and the second turning motor M2 are driven so as to take predetermined fade-in time TF eliminating the gap. Therefore, when the gap is small, the turning angle θw is corrected slowly. Even when the gap is large, since the turning angle θw is corrected within the predetermined fade-in time TF, it is possible to restore an appropriate turning angle more smoothly.

Figure 10:
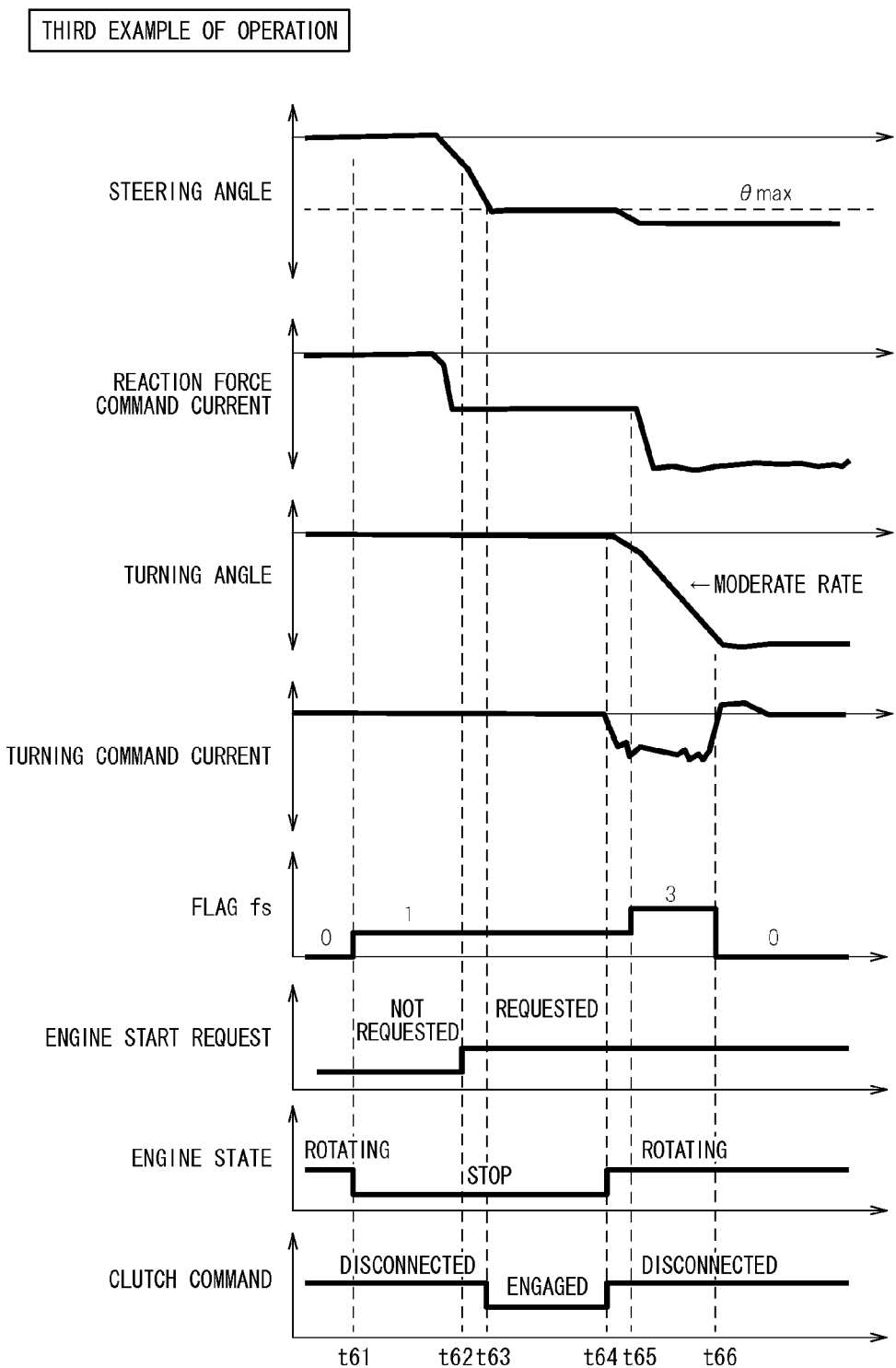
FIG. 10 is a time chart illustrative of the third example of operation.

A time chart of the above-mentioned events will be described as the third example of operation of the present embodiment. FIG. 10 is a time chart illustrative of the third example of operation. When the idle reduction is activated at time t61, the switching flag fs is set to "1". Thus, the turning angle command value switching unit 44 latches the previous value of the turning angle θw*$_{(n-1)}$, that is the turning angle at the time of activating the idle reduction. Therefore, it is possible to suppress the power consumption at the first turning motor M1 or the second turning motor M2.

When the steering operation is started, the restart request is output at time t62, and the target reaction force torque Tr$_{IS}$ at the time of the idle reduction is switched to be used. Thus, the steering wheel 11 becomes less likely to be rotated and the steering angle θs changes gradually. Furthermore, the target reaction force torque Tr$_{IS}$ is set on the basis of at least one of the spring resistance depending on the steering angle θs and the viscous resistance depending on the steering angle speed θs'. Therefore, it is possible to obtain a good operation feeling.

At the time t63, when the steering angle θs reaches the maximum steering angle θmax (determined as "No" in step S110), the clutch 19 is engaged (step S112), and thus the steering angle θs does not substantially exceed the maximum steering angle θmax and stops at nearly the maximum steering angle.

When the restart of the engine 91 is completed (determined as "Yes" in step S109) at time t64, the disengaging command for the clutch 19 is output (step S114) in order to return to the ordinary steering-by-wire.

At time t65, the disengagement of the clutch 19 is completed (determined as "Yes" in step S113), the switching flag fs is set to "3" (step S119). In this way, the reaction force switch unit 25 switches the target reaction force torque to be output from the target reaction torque Tr$_{IS}$ to the ordinary reaction force torque Tr$_N$, and thus the ordinary steering reaction force rises. Furthermore, the turning angle command value switching unit 44 switches the target turning angle to be output from the previous value of the turning angle θw*$_{(n-1)}$ to the ordinary turning angle θw$_N$.

Here, the turning angle control is performed so as to obtain the turning angle θw corresponding to steering angle θs. The turning angle control is slowly performed so as to take the predetermined fade-in time TF. Therefore, it is possible to suppress the sudden rise in the turning current command and the sudden change in the turning angle θw. Thus, it is possible to suppress swing of the vehicle body and generation of the abnormal noise. Furthermore, even when the gap is large, since the turning angle θw is corrected within the predetermined fade-in time TF, it is possible to restore the appropriate turning angle θw more smoothly.

When the fade-in time TF is over (determined as "Yes" in step S117) at time t66, since the turning angle θw corresponding to steering angle θs is obtained, the switching flag fs is set to "0" (step S120) In this way, it is possible to return to the ordinary steering-by-wire and to achieve the intended steering characteristics. What is described above is the description of the third example of operation.

(Modification)

In the present embodiment, there is provided the two motors including the first turning motor M1 and the second turning motor M2 as the motors providing the driving force to the turning output mechanism St$_{OUT}$. The present disclosure is not limited thereto, and may include only one motor. In this way, by decreasing the number of the motors for providing the driving force to the turning output mechanism St$_{OUT}$, it is possible to reduce the number of components.

In the present embodiment, when the vehicle speed becomes 0 km/h, that is, the vehicle is stopped, an automatic stopping (idle reduction) of the engine 91 is permitted. The present disclosure is not limited thereto. For example, the idle reduction of the engine 91 may be permitted when the brake is ON and the vehicle speed is not faster than 7 km/h, for example. That is, the present embodiment can be applied in a case in which the idle reduction is activated even if the vehicle is not completely stopped, in other words before the vehicle is stopped. It is to be noted that, in the case in which the idle reduction is permitted before the vehicle stops, the engine 91 is restarted at the time of turning the accelerator to ON even if the vehicle is not stopped.

In the present embodiment, an electric motor is used as the turning actuator or the reaction force actuator. The present disclosure is not limited thereto. That is, any driving element such as a solenoid or a power cylinder capable of providing the turning output mechanism St$_{OUT}$ with the turning force, or capable of providing the steering input mechanism St$_{IN}$ with the steering reaction force, may be used.

In the above description, the steering input mechanism St$_{IN}$ corresponds to a "steering mechanism", the turning output mechanism St$_{OUT}$ corresponds to a "turning mechanism", the steering shaft 12 corresponds to an "input shaft", and the first pinion shaft 18 corresponds to an "output shaft". Furthermore, the first turning motor M1 and the second turning motor M2 correspond to a "turning actuator", the first turning controller 71, the second turning controller 72, and the reaction force controller 73 correspond to a "steering control unit", and the engine controller 81 corresponds to an "idle reduction control unit".

(Effects)

Next, the effects of the substantial portion of the first embodiment will be described.

(1) The steering control device according to the present embodiment is used in the vehicle, the vehicle including the engine 91 and the engine controller 81 configured to stop the idling of the engine 91 when the predetermined condition is satisfied and to restart the engine 91 when the vehicle starts moving. There are provided the steering input mechanism St$_{IN}$ with the steering shaft 12 capable of rotating by the steering operation by the driver and the turning output mechanism St$_{OUT}$ configured to turn the wheel by the rotation of the first pinion shaft 18. Furthermore, there are provided the clutch 19 configured to couple and decouple the steering shaft 12 and the first pinion shaft 18, the turning motors M1 and M2 capable of providing the turning torque to the turning output mechanism St$_{OUT}$, and the engine 91 driving the vehicle. Furthermore, the steering-by-wire control processing is performed. In the steering-by-wire control processing, the clutch 19 is disengaged and the control of the driving of the turning motors M1 and M2 is performed when the engine 91 is in the working state, and the clutch 19 is engaged and the control of the driving of the turning motors M1 and M2 is stopped when the engine 91 is in the stop state. Then, when the engine controller 81 stops the idling of the engine 91, the disengaged state of the clutch 19 is maintained. In this way, since the disengaged state of the clutch 19 is maintained when the idling of the engine 91 is stopped by the idle reduction function, it is possible to suppress the operating sound caused when engaging the clutch 19. Therefore, it is possible to improve silence in the vehicle interior space in the idle reduction state.

(2) In the steering control device according to the present embodiment, the maximum steering angle θmax is defined as a steering angle θs corresponding to a maximum turning angle θw defined structurally. Then, when the steering angle θs reaches the maximum steering angle θmax while the engine controller 81 stops the idling of the engine 91, the clutch 19 is engaged. In this way, by engaging the clutch 19 when the steering angle θs reaches the maximum steering angle θmax, it is possible to prevent the steering angle θs from increasing to be larger than the maximum steering angle θmax. Thus, it is possible to suppress the power consumption or overheating due to an overload of the reaction force motor 51, and to obtain a good operation feeling by notifying the driver of a rack end (end-abutting).

(3) The steering control method according to the embodiment is applied to the vehicle, the vehicle including the idle reduction function of stopping the idling of the engine 91 when the predetermined condition is satisfied and restarting the engine 91 when the vehicle starts moving. Then, the clutch 19 is provided between the steering input mechanism $St_{IN}$ with the steering shaft 12 capable of rotating by the steering operation by the driver and the turning output mechanism $St_{OUT}$ configured to turn the wheel by the rotation of the first pinion shaft 18. The clutch 19 is capable of coupling and decoupling the steering shaft 12 and the first pinion shaft 18. Furthermore, there are provided the turning motors M1 and M2 capable of providing the turning torque to the turning output mechanism $St_{OUT}$. Furthermore, the clutch 19 is disengaged and the control of the driving of the turning motors M1 and M2 is performed when the engine 91 is in the working state, and the clutch 19 is engaged and the control of the driving of the turning motors M1 and M2 is stopped when the engine 91 is in the stop state. Furthermore, when the engine 91 which has been in the working state is stopped by the idle reduction function, the disengaged state of the clutch 19 is maintained. In this way, since the disengaged state of the clutch 19 is maintained when the idling of the engine 91 is stopped by the idle reduction function, it is possible to suppress the operating sound caused when engaging the clutch 19. Therefore, it is possible to improve silence in the vehicle interior space in the idle reduction state.

(4) The steering control device according to the present embodiment is used in the vehicle, the vehicle including the engine 91 and the engine controller 81 configured to stop the idling of the engine 91 when the predetermined condition is satisfied and to restart the engine 91 when the vehicle starts moving. There are provided the steering input mechanism $St_{IN}$ with the steering shaft 12 capable of rotating by the steering operation by the driver and the turning output mechanism $St_{OUT}$ configured to turn the wheel by the rotation of the first pinion shaft 18. Furthermore, there are provided the clutch 19 configured to couple and decouple the steering shaft 12 and the first pinion shaft 18, the turning motors M1 and M2 capable of providing the turning torque to the turning output mechanism $St_{OUT}$, and the reaction force motor 51 capable of providing the steering reaction force to the steering input mechanism $St_{IN}$. Furthermore, the steering-by-wire control processing is performed. In the steering-by-wire control processing, the clutch 19 is disengaged and the control of the driving of the turning motors M1 and M2 and the reaction force motor 51 is performed. Then, when the engine controller 81 stops the idling of the engine 91, the disengaged state of the clutch 19 is maintained and the driving of the turning motors M1 and M2 and the driving of the reaction force motor 51 are restricted. In this way, when the idling of the engine 91 is stopped by the idle reduction function, the driving of the turning motors M1 and M2 and the driving of the reaction force motor 51 are restricted. Thus, it is possible to suppress the power consumption. Therefore, it is possible to suppress the voltage drop in the battery 95 in the idle reduction state.

(5) In the steering control device according to the present embodiment, the driving of the turning motors M1 and M2 is restricted more greatly than the driving of the reaction force motor 51. In this way, by prioritizing the steering reaction force control over the turning angle control to keep a moderate steering reaction force, it is possible to suppress the degradation of the operation feeling.

(6) In the steering control device according to the present embodiment, the restriction of the driving of the turning motors M1 and M2 and the driving of the reaction force motor 51 is canceled when the engine controller 81 restarts the engine 91. In this way, when the engine 91 is restarted, the problem of the voltage drop of the battery 95 does not happen. Thus, it is possible to cancel the restriction of the steering-by-wire immediately to obtain a good operation feeling again.

(7) In the steering control device according to the present embodiment, the restriction of the driving of the turning motors M1 and M2 and the driving of the reaction force motor 51 is canceled when the vehicle starts to move while the engine controller 81 stops the idling of the engine 91. When the vehicle starts to move, by returning to the ordinary steering-by-wire immediately in this way to ensure the control performance of the vehicle, it is possible to suppress that the driver feels uneasy.

(8) The steering control method according to the embodiment is applied to the vehicle, the vehicle including the idle reduction function of stopping the idling of the engine 91 when the predetermined condition is satisfied and restarting the engine 91 when the vehicle starts moving. Then, the clutch 19 is provided between the steering input mechanism $St_{IN}$ with the steering shaft 12 capable of rotating by the steering operation by the driver and the turning output mechanism $St_{OUT}$ configured to turn the wheel by the rotation of the first pinion shaft 18. The clutch 19 is capable of coupling and decoupling the steering shaft 12 and the first pinion shaft 18. Furthermore, there are provided the turning motors M1 and M2 capable of providing the turning torque to the turning output mechanism $St_{OUT}$, as well as the reaction force motor 51 capable of providing the steering reaction force to the steering input mechanism $St_{IN}$. The clutch 19 is disengaged and the control of the driving of the turning motors M1 and M2 and the reaction force motor 51 is performed. Then, when the idling of the engine 91 is stopped by the idle reduction function, the disengaged state of the clutch 19 is maintained and the driving of the turning motors M1 and M2 and the driving of the reaction force motor 51 are restricted. In this way, when the idling of the engine 91 is stopped by the idle reduction function, the driving of the turning motors M1 and M2 and the driving of the reaction force motor 51 are restricted. Thus, it is possible to suppress the power consumption. Therefore, it is possible to suppress the voltage drop in the battery 95 in the idle reduction state.

(9) The steering control device according to the present embodiment is used in the vehicle, the vehicle including the engine 91 and the engine controller 81 configured to stop the idling of the engine 91 when the predetermined condition is satisfied and to restart the engine 91 when the vehicle starts moving. There are provided the steering input mechanism $St_{IN}$ with the steering shaft 12 capable of rotating by the steering operation by the driver and the turning output mechanism $St_{OUT}$ configured to turn the wheel by the rotation of the first pinion shaft 18. Furthermore, there are provided the clutch 19 configured to couple and decouple the steering shaft 12 and the first pinion shaft 18, the turning motors M1 and M2 capable of providing the turning torque to the turning output mechanism $St_{OUT}$, and the reaction force motor 51 capable of providing the steering reaction force to the steering input mechanism $St_{IN}$. Furthermore, the steering-by-wire control processing is performed. In the steering-by-wire control processing, the clutch 19 is disengaged and the control of the driving of the turning motors M1 and M2 and the reaction force motor 51 is performed. Then, when the engine controller 81 stops the idling of the engine 91, the disengaged state of the clutch 19 is maintained, and the driving of the turning motors M1 and M2 is restricted, and the driving of the reaction force motor 51 is restricted so as to restrict the steering reaction force in a range capable of preventing the steering shaft 12 from spinning free even when the driver releases his or her hand. In this way, when the idling of the engine 91 is stopped by the idle reduction function, by restricting the steering reaction force in a range capable of preventing the steering shaft 12 from spinning free even when the driver releases his or her hand, it is possible to suppress the power consumption. Thus, it is possible to suppress the voltage drop of the battery 95 in the idle reduction state. Furthermore, since the steering reaction force is not restricted excessively, it is possible to suppress the degradation of the operation feeling.

(10) In the steering control device according to the present embodiment, the steering reaction force is set on the basis of at least one of the spring resistance depending on the steering angle θs and the viscous resistance depending on the steering angle speed θs'. In this way, by setting the steering reaction force on the basis of at least one of the spring resistance depending on the steering angle θs and the viscous resistance depending on the steering angle speed θs', it is possible to obtain a good operation feeling.

(11) In the steering control device according to the present embodiment, the turning angle θw at the time when the engine controller 81 stops the idling of the engine 91 is maintained. In this way, by maintaining the turning angle θw at the time of stopping the idling of the engine 91, it is possible to surely suppress the power consumption at the turning motors M1 and M2.

(12) The steering control method according to the embodiment is applied to the vehicle, the vehicle including the idle reduction function of stopping the idling of the engine 91 when the predetermined condition is satisfied and restarting the engine 91 when the vehicle starts moving. Then, the clutch 19 is provided between the steering input mechanism $St_{IN}$ with the steering shaft 12 capable of rotating by the steering operation by the driver and the turning output mechanism $St_{OUT}$ configured to turn the wheel by the rotation of the first pinion shaft 18. The clutch 19 is capable of coupling and decoupling the steering shaft 12 and the first pinion shaft 18. Furthermore, there are provided the turning motors M1 and M2 capable of providing the turning torque to the turning output mechanism $St_{OUT}$, as well as the reaction force motor 51 capable of providing the steering reaction force to the steering input mechanism $St_{IN}$. The clutch 19 is disengaged and the control of the driving of the turning motors M1 and M2 and the reaction force motor 51 is performed. Then, when the idling of the engine 91 is stopped by the idle reduction function, the disengaged state of the clutch 19 is maintained, and the driving of the turning motors M1 and M2 is restricted, and the driving of the reaction force motor 51 is restricted so as to restrict the steering reaction force in the range capable of preventing the steering shaft 12 from spinning free even when the driver releases his or her hand. In this way, when the idling of the engine 91 is stopped by the idle reduction function, by restricting the steering reaction force in the range capable of preventing the steering shaft 12 from spinning free even when the driver releases his or her hand, it is possible to suppress the power consumption. Thus, it is possible to suppress the voltage drop of the battery 95 in the idle reduction state. Furthermore, since the steering reaction force is not restricted excessively, it is possible to suppress the degradation of the operation feeling.

(13) The steering control device according to the present embodiment is used in the vehicle, the vehicle including the engine 91 and the engine controller 81 configured to stop the idling of the engine 91 when the predetermined condition is satisfied and to restart the engine 91 when the vehicle starts moving. There are provided the steering input mechanism $St_{IN}$ with the steering shaft 12 capable of rotating by the steering operation by the driver and the turning output mechanism $St_{OUT}$ configured to turn the wheel by the rotation of the first pinion shaft 18. Furthermore, there are provided the clutch 19 configured to couple and decouple the steering shaft 12 and the first pinion shaft 18, the turning motors M1 and M2 capable of providing the turning torque to the turning output mechanism $St_{OUT}$, and the reaction force motor 51 capable of providing the steering reaction force to the steering input mechanism $St_{IN}$. Furthermore, the steering-by-wire control processing is performed. In the steering-by-wire control processing, the clutch 19 is disengaged and the control of the driving of the turning motors M1 and M2 and the reaction force motor 51 is performed. Then, when the engine controller 81 stops the idling of the engine 91, the disengaged state of the clutch 19 is maintained, and the driving of the turning motors M1 and M2 is restricted so as to maintain the turning angle θw at the time of stopping the idling of the engine 91, and the driving of the reaction force motor 51 is restricted. Furthermore, when the engine controller 81 restarts the engine 91, the restriction of the driving of the turning motors M1 and M2 and the driving of the reaction force motor 51 is canceled. In a case in which the steering angle θs has been changed while idling of the engine 91 has been stopped and thus a gap is generated between the turning angle θw and the steering angle θs, the turning motors M1 and M2 are driven so as to take the predetermined time eliminating the gap. In this way, when the steering angle θs has been changed while idling of the engine 91 has been stopped by the idle reduction function and thus the gap is generated between the turning angle θw and the steering angle θs, the turning motors M1 and M2 are driven so as to take the predetermined fade-in time TF eliminating the gap. Therefore, when the gap is small, the turning angle θw is corrected slowly. Even when the gap is large, since the turning angle θw is corrected within the predetermined fade-in time TF, it is possible to restore an appropriate turning angle more smoothly.

(14) The steering control method according to the embodiment is applied to the vehicle, the vehicle including the idle reduction function of stopping the idling of the engine 91 when the predetermined condition is satisfied and restarting the engine 91 when the vehicle starts moving. Then, the clutch 19 is provided between the steering input mechanism $St_{IN}$ with the steering shaft 12 capable of rotating by the steering operation by the driver and the turning output mechanism $St_{OUT}$ configured to turn the wheel by the rotation of the first pinion shaft 18. The clutch 19 is capable of coupling and decoupling the steering shaft 12 and the first pinion shaft 18. Furthermore, there are provided the turning motors M1 and M2 capable of providing the turning torque to the turning output mechanism $St_{OUT}$, as well as the reaction force motor 51 capable of providing the steering reaction force to the steering input mechanism $St_{IN}$. The clutch 19 is disengaged and the control of the driving of the turning motors M1 and M2 and the reaction force motor 51 is performed. Then, when the idling of the engine 91 is stopped by the idle reduction function, the disengaged state of the clutch 19 is maintained, and the driving of the turning motors M1 and M2 is restricted so as to maintain the turning angle θw at the time of stopping the idling of the engine 91, and the driving of the reaction force motor 51 is restricted. Furthermore, when restarting the engine 91 by the idle reduction function, the restriction of the driving of the turning motors M1 and M2 and the driving of the reaction force motor 51 is canceled. In a case in which the steering angle θs has been changed while idling of the engine 91 has been stopped and thus a gap is generated between the turning angle θw and the steering angle θs, the turning motors M1 and M2 are driven so as to take the predetermined time eliminating the gap. In this way, when the steering angle θs has been changed while the idling of the engine 91 has been stopped by the idle reduction function and thus the gap is generated between the turning angle θw and the steering angle θs, the turning motors M1 and M2 are driven so as to take the predetermined fade-in time TF eliminating the gap. Therefore, when the gap is small, the turning angle θw is corrected slowly. Even when the gap is large, since the turning angle θw is corrected within the predetermined fade-in time TF, it is possible to restore an appropriate turning angle more smoothly.

(15) In the steering control device according to the present embodiment, the idling of the engine 91 is stopped at the time of stopping the vehicle. By stopping the idling of the engine 91 at the time of stopping the vehicle in this way, it is possible to reduce exhaust emissions and to improve fuel efficiency.

(16) In the steering control device according to the present embodiment, the turning actuator includes an electric motor. By using the electric motor as the turning actuator for providing the turning torque to the turning output mechanism $St_{OUT}$ in this way, it is possible to easily control the turning of the wheel.

(17) In the steering control device according to the present embodiment, when the engine 91 is in the working state, the clutch 19 is disengaged and the control of the driving of the turning motors M1 and M2 is performed. Furthermore, when the clutch 19 is in the stop state, the clutch 19 is engaged and the control of the driving of the turning motors M1 and M2 is stopped. By controlling the driving of the turning motors M1 and M2 in the state in which the clutch 19 is disengaged when the engine 91 is in the working state in this way, it is possible to achieve the intended steering characteristics as the steering-by-wire function. Furthermore, by stopping the control of the driving of the turning motors M1 and M2 in the state in which the clutch 19 is engaged when the clutch 19 is in the stop state, it is possible to suppress a gap in the relation between the turning angle and the steering angle.

(18) In the steering control device according to the present embodiment, the reaction force actuator includes an electric motor. By using the electric motor as the reaction force actuator for providing the steering reaction force to the steering input mechanism $St_{IN}$ in this way, it is possible to easily control the steering reaction force.

While the present invention has been described with reference to the definite number of embodiments, the scope of the present invention is not limited thereto and modifications of the embodiments based on the above disclosure are obvious to those skilled in the art.

The invention claimed is:

1. A steering control device used in a vehicle, the vehicle including an engine for driving the vehicle and an idle reduction control unit configured to stop the engine when a predetermined condition is satisfied and to restart the engine when the vehicle starts moving, the steering control device comprising:
    a steering mechanism configured to be operated by a driver to steer;
    a turning mechanism configured to turn a wheel;
    a clutch configured to enable the steering mechanism and the turning mechanism to be coupled with each other in an engaged state and decoupled from each other in a disengaged state;
    a turning actuator capable of providing a turning torque to the turning mechanism depending on an amount of steering by the driver; and
    a steering control unit configured to disengage the clutch and to perform control of driving of the turning actuator,
    wherein the steering control unit is configured to maintain the disengaged state of the clutch and to restrict a drive torque of the turning actuator when the idle reduction control unit stops the engine.

2. The steering control device according to claim 1, further comprising a reaction force actuator capable of providing a steering reaction force to the steering mechanism, wherein the steering control unit is configured:
    to disengage the clutch and to perform the control of the driving of the turning actuator and control of driving of the reaction force actuator; and
    to maintain the disengaged state of the clutch and to restrict the drive torque of the turning actuator and a drive torque of the reaction force actuator when the idle reduction control unit stops the engine.

3. The steering control device according to claim 2, wherein the steering control unit is configured to restrict the drive torque of the turning actuator and the drive torque of the reaction force actuator such that power consumption of the turning actuator is smaller than power consumption of the reaction force actuator.

4. The steering control device according to claim 2, wherein the steering control unit is configured to cancel restriction of the drive torque of the turning actuator and the drive torque of the reaction force actuator when the idle reduction control unit restarts the engine.

5. The steering control device according to claim 2, wherein the steering control unit is configured to cancel restriction of the drive torque of the turning actuator and the drive torque of the reaction force actuator when the vehicle moves while the idle reduction control unit stops the engine.

6. The steering control device according to claim 1, wherein the idle reduction control unit is configured to stop the engine at a time of stopping the vehicle.

7. The steering control device according to claim 2, wherein the turning actuator and the reaction force actuator each comprise an electric motor.

8. The steering control device according to claim 2, wherein the steering control unit is configured, when the idle reduction control unit stops the engine, to maintain a disengaged state of the clutch, and to restrict the drive torque of the turning actuator, and to restrict the drive torque of the reaction force actuator to restrict the steering reaction force in a range capable of preventing the steering mechanism from rotating due to a center of gravity even when the driver releases his or her hand from the steering mechanism.

9. The steering control device according to claim 8, wherein the steering control unit is configured to set the steering reaction force based on at least one of a spring resistance depending on a steering angle and a viscous resistance depending on a steering angle speed.

10. The steering control device according to claim 1, wherein the steering control unit is configured to maintain a turning angle at a time when the idle reduction control unit stops the engine.

11. The steering control device according to claim 1, wherein the steering control unit is configured to engage the clutch when a steering angle reaches a maximum steering angle while the idle reduction control unit stops the engine, the maximum steering angle corresponding to a maximum turning angle defined structurally.

12. A steering control method applied to a vehicle, the vehicle including an idle reduction function of stopping an engine when a predetermined condition is satisfied and restarting the engine when the vehicle starts moving, the steering control method comprising:
 coupling a steering mechanism configured to be operated by a driver to steer and a turning mechanism configured to turn a wheel, via a clutch provided between the steering mechanism and the turning mechanism, the clutch being capable of coupling and decoupling the steering mechanism and the turning mechanism between an engaged state and a disengaged state, respectively;
 providing a turning torque to the turning mechanism by a turning actuator depending on an amount of steering by a driver;
 disengaging the clutch and performing control of driving of the turning actuator; and
 maintaining the disengaged state of the clutch and restricting a drive torque of the turning actuator, when stopping the engine by the idle reduction function.

13. A steering control device used in a vehicle, the vehicle including an engine for driving the vehicle and an idle reduction control means for stopping the engine when a predetermined condition is satisfied and for restarting the engine when the vehicle starts moving, the steering control device comprising:
 a clutch means for coupling a steering mechanism configured to be operated by a driver to steer and a turning mechanism configured to turn a wheel, such that the steering mechanism and the turning mechanism are couplable with and decouplable from each other in an engaged state and a disengaged state, respectively;
 a torque providing means for providing a turning torque to the turning mechanism depending on an amount of steering operated by the driver; and
 a steering control means for disengaging the clutch means and for performing control of driving of the torque providing means,
 wherein the steering control means maintains the disengaged state of the clutch means and restricts a drive torque of the torque providing means when the idle reduction control means stops the engine.

* * * * *